US008060599B2

(12) United States Patent
Cherkasova et al.

(10) Patent No.: US 8,060,599 B2
(45) Date of Patent: Nov. 15, 2011

(54) SYSTEM AND METHOD FOR DETERMINING A STREAMING MEDIA SERVER CONFIGURATION FOR SUPPORTING EXPECTED WORKLOAD IN COMPLIANCE WITH AT LEAST ONE SERVICE PARAMETER

(75) Inventors: Ludmila Cherkasova, Sunnyvale, CA (US); Wenting Tang, Sunnyvale, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2623 days.

(21) Appl. No.: 10/801,793

(22) Filed: Mar. 16, 2004

(65) Prior Publication Data
US 2005/0228879 A1 Oct. 13, 2005

(51) Int. Cl.
*G06F 15/173* (2006.01)
(52) U.S. Cl. ........ 709/224; 709/203; 709/217; 709/226; 709/231; 709/232; 709/234; 709/235
(58) Field of Classification Search .................. 709/203, 709/217, 226, 231, 232, 234, 235, 224, 241
See application file for complete search history.

(56) References Cited

U.S. PATENT DOCUMENTS

| | | | |
|---|---|---|---|
| 5,603,029 A * | 2/1997 | Aman et al. .................. 718/105 |
| 5,732,239 A | 3/1998 | Tobagi et al. | |
| 5,734,119 A | 3/1998 | France et al. | |
| 5,815,662 A | 9/1998 | Ong | |
| 5,881,238 A * | 3/1999 | Aman et al. .................. 709/226 |
| 5,890,162 A * | 3/1999 | Huckins ..................... 707/104.1 |
| 5,953,707 A | 9/1999 | Huang et al. | |
| 6,067,107 A | 5/2000 | Travaille et al. | |
| 6,101,547 A | 8/2000 | Mukherjee et al. | |
| 6,178,480 B1 | 1/2001 | Tobagi et al. | |
| 6,249,800 B1 * | 6/2001 | Aman et al. .................. 718/105 |
| 6,263,361 B1 | 7/2001 | Hoyer et al. | |
| 6,279,039 B1 | 8/2001 | Bhat et al. | |
| 6,292,834 B1 | 9/2001 | Ravi et al. | |
| 6,356,947 B1 | 3/2002 | Lutterschmidt | |
| 6,434,621 B1 | 8/2002 | Pezzillo et al. | |
| 6,438,592 B1 | 8/2002 | Killian | |
| 6,459,682 B1 * | 10/2002 | Ellesson et al. ............... 370/235 |
| 6,571,288 B1 | 5/2003 | Sarukkai | |
| 6,606,658 B1 | 8/2003 | Uematsu | |
| 6,928,477 B1 * | 8/2005 | Leymann et al. ............. 709/226 |
| 7,272,707 B2 * | 9/2007 | Liu et al. ............................ 713/1 |
| 2002/0083124 A1 | 6/2002 | Knox et al. | |

(Continued)

OTHER PUBLICATIONS

Acharya, S. et al., "Characterizing User Access to Videos on the World Wide Web," Part of the IS&T/SPIE Conference on Multimedia computing and Networking 2000, SPIE vol. 3969, 2000, pp. 130-141.

(Continued)

*Primary Examiner* — Michael Won

(57) ABSTRACT

According to at least one embodiment, a method comprises receiving, into a capacity planning system, workload information representing an expected workload of client accesses of streaming media files from a site. The method further comprises receiving, into the capacity planning system, at least one service parameter that defines a desired service characteristic to be provided by a media server configuration under the expected workload. The method further comprises determining, by the capacity planning system, for at least one server configuration, how many servers of the at least one server configuration to be included at the site for supporting the expected workload in compliance with the at least one service parameter.

23 Claims, 11 Drawing Sheets

U.S. PATENT DOCUMENTS

| | | | |
|---|---|---|---|
| 2002/0091722 | A1 | 7/2002 | Gupta et al. |
| 2002/0129048 | A1 | 9/2002 | Qiu et al. |
| 2002/0150102 | A1 | 10/2002 | Janko et al. |
| 2002/0152305 | A1* | 10/2002 | Jackson et al. ............ 709/224 |
| 2002/0156552 | A1 | 10/2002 | Whiting |
| 2003/0097443 | A1 | 5/2003 | Gillett et al. |
| 2003/0115244 | A1 | 6/2003 | Molloy et al. |
| 2004/0111509 | A1* | 6/2004 | Eilam et al. ............... 709/224 |
| 2004/0181594 | A1* | 9/2004 | Suleiman .................. 709/225 |

OTHER PUBLICATIONS

Almeida, J. et al., "Analysis of Educational Media Server Workloads," Proc. 11th Int'l Workshop, 2001, 10 pages.

Chase, J. et al., "Managing Energy and Server Resources in Hosting Centers," Dept. of Computer Science, Duke University, 14 pages.

U.S. Appl. No. 10/306,279, Cherkasova et al.

U.S. Appl. No. 10/660,978, Cherkasova et al.

U.S. Appl. No. 10/601,956, Cherkasova et al.

U.S. Appl. No. 10/601,992, Cherkasova et al.

Cherkasova, L. et al., "Characterizing Locality, Evolution, and Life span of Accesses in Enterprise Media Server Workloads," NOSSDAV '02, May 12-14, 2002, 10 pages.

Cherkasova, L. et al., "Building a Performance Model of Streaming Media Applications in Utility Data Center Environment," Hewlett-Packard Laboratories, Internet Systems and Storage Lab, 12 pages.

Cherkosava, I. et al., "Sizing the Streaming Media Cluster Solution for a Given Workload," Hewlett-Packard Laboratories, 8 pages.

"Data center virtualization benefits", [Online] Retrieved Dec. 12, 2003 Retrieved from http://h71028.www7.hp.com/enterprise/cache—2 pages.

Dan, A. et al., "Buffering and Caching Large-Scale Video Servers," IEEE 1995, pp. 217-224.

Eager, D. et al., "Optimal and Efficient Merging Schedules for Video-on-Demand Servers," Proc. ACM Multimedia 1999, 4 pages.

U.S. Appl. No. 10/738,273, Cherkasova et al.

Kim, I. et al., "VBR Video Data Scheduling using Window-Based Prefetching," IEEE 1999, pp. 159-164.

Nahrstedt, K. et al., "A Probe-based Algorithm for QoS Specification and Adaptation," Univ. of Illinois at Urbana Champaign, pp. 1-12.

Nahrstedt, K. et al., "QoS-Aware Applications," Univ. of Illinois at Resource Managment for Distributed Multimedia Urbana Champaign, Dept. of Computer Science, pp. 1-37.

Ranjan, S. et al., "QoS-Driven Server Migration for Internet Data Centers," Proc. of IWQoS 2002, 10 pages.

Shenoy, P. et al., "Middleware versus Native OS Support: Architectural Considerations for Supporting Multimedia Applications," Univ. of Massachusetts, Dept. of Computer Science, 10 pages.

Anderson, R. et al., "Unraveling the Mysteries of Clustering", [Online] Retrieved Jan. 6, 2004 Retrieved from http://www.nwc.com—5 sections—total of 19 pages.

Definition of "Cluster Computing", [Online] Retrieved Jan. 6, 2004 Retrieved from http://search390.techtarget.com/sDefinition—3 pages.

"Cluster" [Online] Retrieved Jan. 6, 2004 Retrieved from http://whatis.techtarget.com/definition 4 pages.

"HP Utility Data Center", [Online] Retrieved Dec. 12, 2003 Retrieved from http://h71028.www7.hp.com/enterprise/cache—2 pages.

"Data center virtualization overview", [Online] Retrieved Dec. 12, 2003 Retrieved from http://h71028.www7.hp.com/enterprise/cache—2 pages.

"Data center virtualization architecture", [Online] Retrieved Dec. 12, 2003 Retrieved from http://h71028.www7.hp.com/enterprise/cache—2 pages.

* cited by examiner

| TIME | CONCURRENT CONNECTIONS | | | | | | | | | | | | | |
|---|---|---|---|---|---|---|---|---|---|---|---|---|---|---|
| | 28Kb/s | | 56Kb/s | | 112Kb/s | | 256Kb/s | | 350Kb/s | | 500Kb/s | |
| | MEMORY | DISK | MEMORY | DISK | MEMORY | DISK | MEMORY | DISK | MEMORY | DISK | MEMORY | DISK |
| ... | | | | | | | | | | | | |
| $T_1$ | 2 | 1 | 0 | 2 | 3 | 0 | 6 | 1 | 5 | 0 | 8 | 2 |
| ... | | | | | | | | | | | | |

OUTPUT OF MEDIA PROFILER: MEDIA SITE WORKLOAD PROFILE — 203

| TIME STAMP | CONCURRENT SESSIONS | <56Kb/s | | 56-112Kb/s | | >112Kb/s | |
|---|---|---|---|---|---|---|---|
| | | DISK | MEMORY | DISK | MEMORY | DISK | MEMORY |
| ⋮ | ⋮ | ⋮ | ⋮ | ⋮ | ⋮ | ⋮ | ⋮ |
| $t_i-1$ | 100 | 2 | 0 | 5 | 2 | 85 | 6 |
| $t_i$ | 104 | 2 | 0 | 5 | 2 | 89 | 6 |
| $t_i+1$ | 103 | 1 | 0 | 5 | 2 | 89 | 6 |
| ⋮ | ⋮ | ⋮ | ⋮ | ⋮ | ⋮ | ⋮ | ⋮ |

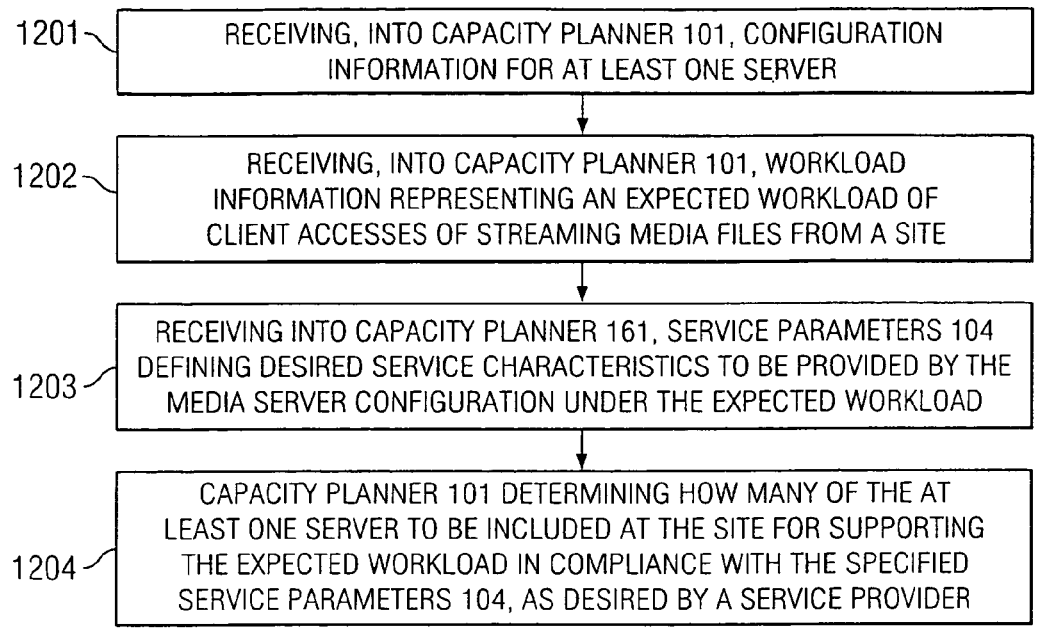
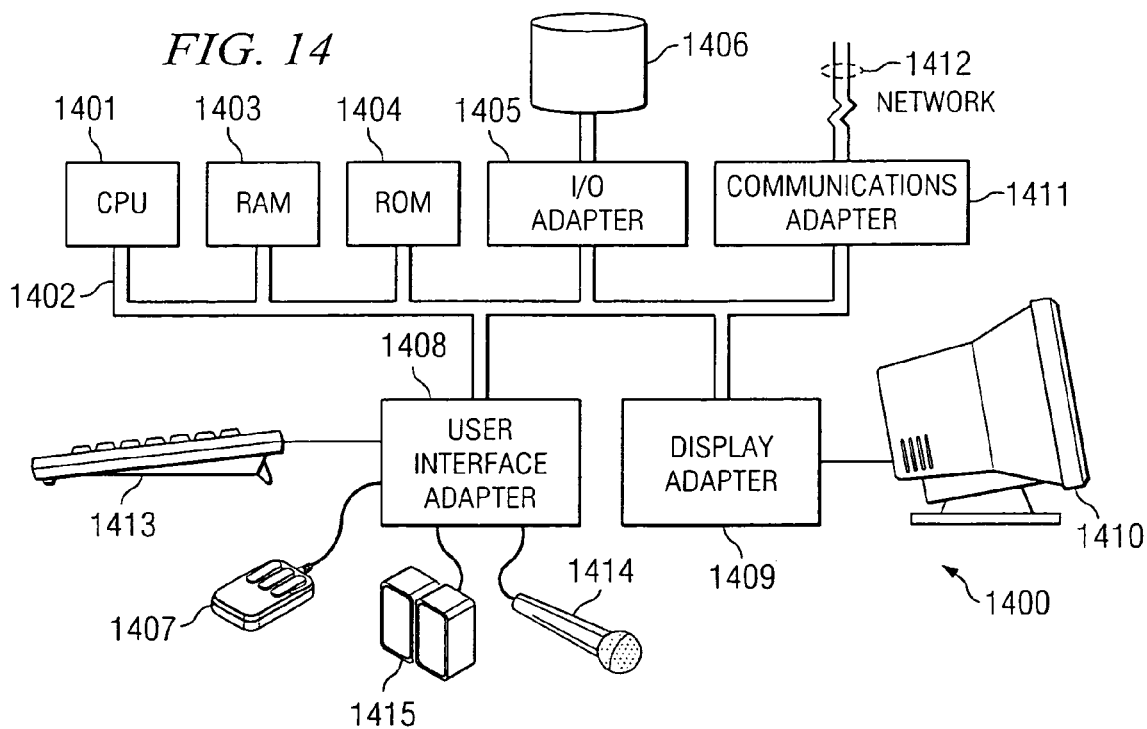

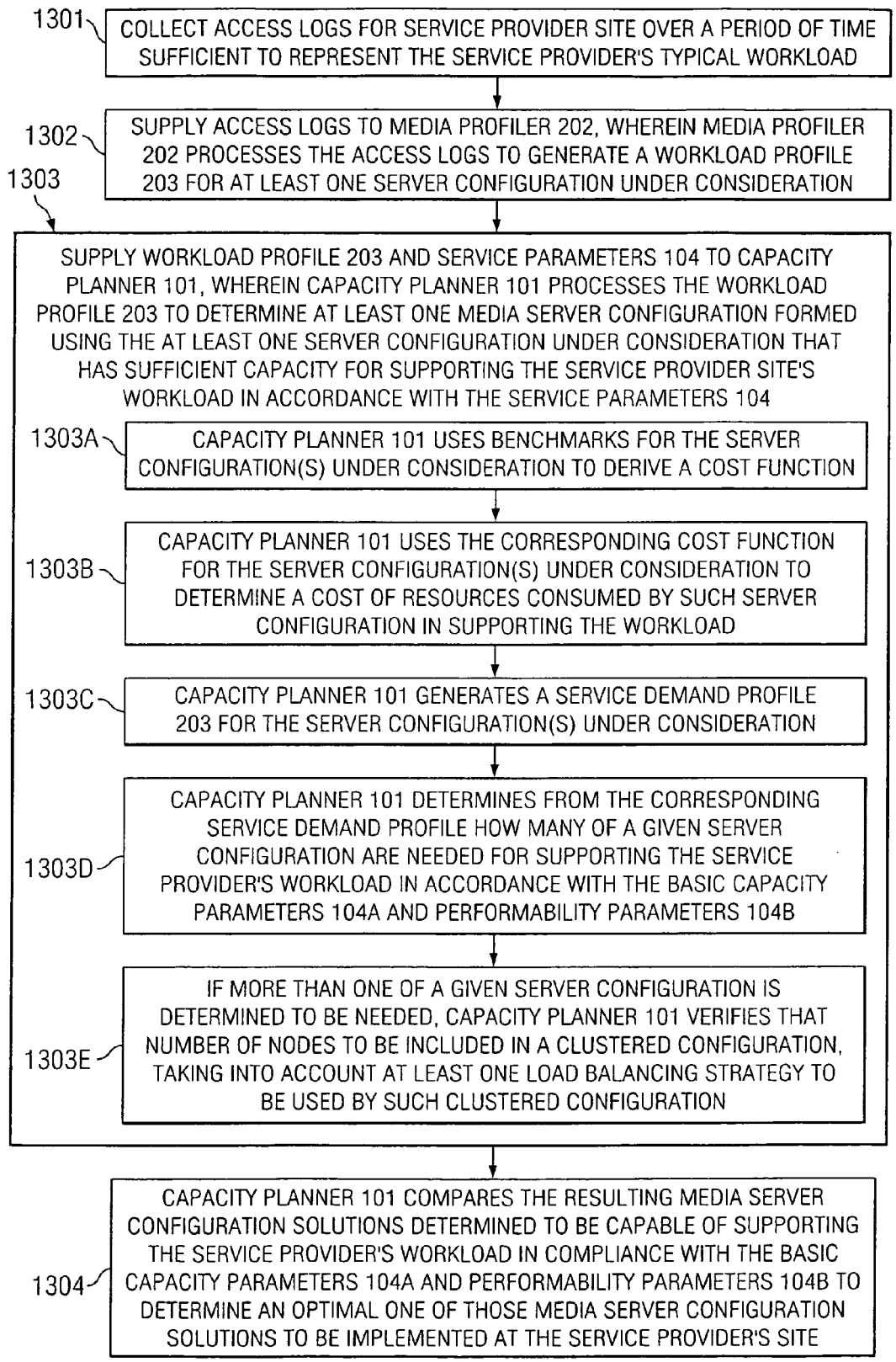

SYSTEM AND METHOD FOR DETERMINING A STREAMING MEDIA SERVER CONFIGURATION FOR SUPPORTING EXPECTED WORKLOAD IN COMPLIANCE WITH AT LEAST ONE SERVICE PARAMETER

CROSS-REFERENCE TO RELATED APPLICATIONS

This application is related to the following co-pending and commonly assigned patent applications: 1) U.S. patent application Ser. No. 10/306,279 filed Nov. 27, 2002 entitled "SYSTEM AND METHOD FOR MEASURING THE CAPACITY OF A STREAMING MEDIA SERVER," 2) U.S. patent application Ser. No. 10/601,956 filed Jun. 23, 2003 entitled "SYSTEM AND METHOD FOR MODELING THE MEMORY STATE OF A STREAMING MEDIA SERVER," 3) U.S. patent application Ser. No. 10/601,992 filed Jun. 23, 2003 entitled "COST-AWARE ADMISSION CONTROL FOR STREAMING MEDIA SERVER," 4) U.S. patent application Ser. No. 10/660,978 filed Sep. 12, 2003 entitled "SYSTEM AND METHOD FOR EVALUATING A CAPACITY OF A STREAMING MEDIA SERVER FOR SUPPORTING A WORKLOAD," and 5) U.S. patent application Ser. No. 10/738,273 filed Dec. 17, 2003 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD," the disclosures of which are hereby incorporated herein by reference.

TECHNICAL FIELD

The following description relates in general to evaluating a capacity of a streaming media server for supporting a workload, and more particularly to a system and method for determining a streaming media server configuration capable of supporting an expected workload in compliance with at least one service parameter.

BACKGROUND OF THE INVENTION

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (e.g., a media server) to a client and begins playing on the client before fully downloaded.

Media servers are typically implemented for providing streaming media to clients. A "cluster" is often used to implement a media server. In general, a cluster is a group of nodes (e.g., servers and/or other resources) that appear to a user as a single system. For instance, a plurality of servers may be implemented as a cluster to form a single media server for serving streaming media files to requesting clients. While a plurality of different servers are used for servicing the clients' requests, to each client the cluster appears to be a single media server (i.e., it appears to the clients that they are accessing a single media server). Such cluster computing may be implemented to provide high availability (e.g., through redundancy provided by the plurality of nodes), parallel processing, and/ or load balancing. Various load balancing strategies may be used for a cluster, including as examples a round-robin strategy or a "locality-aware" strategy, e.g., Locality-Aware Request Distribution ("LARD") strategy.

Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server, even a clustered media server, for supporting a given "workload" (i.e., a number of concurrent client accesses of streaming media from the media server). Streaming media service providers have traditionally had difficulty in evaluating whether a given media server configuration (e.g., a server implementation having a certain size of memory, certain disk configuration, certain number of nodes in a cluster, etc.) provides sufficient capacity for supporting the service providers' workload as desired. Thus, streaming media service providers have traditionally had difficulty in evaluating different media server configurations for capacity planning to, for example, determine the most cost-effective configuration that is capable of supporting the service providers' media service workload.

BRIEF SUMMARY OF THE INVENTION

According to at least one embodiment, a method comprises receiving, into a capacity planning system, workload information representing an expected workload of client accesses of streaming media files from a site. The method further comprises receiving, into the capacity planning system, at least one service parameter that defines a desired service characteristic to be provided by a media server configuration under the expected workload. The method further comprises determining, by the capacity planning system, for at least one server configuration, how many servers of the at least one server configuration to be included at the site for supporting the expected workload in compliance with the at least one service parameter.

According to at least one embodiment, a method comprises receiving, into a capacity planning tool, information about a first server configuration, and receiving, into the capacity planning tool, workload information representing an expected workload of client accesses of streaming media files from a site. The method further comprises receiving, into the capacity planning system, at least one performability parameter that defines a desired service characteristic to be provided by a media server configuration during non-compliant periods of operation under the expected workload, and the capacity planning tool determining how many servers of the first server configuration to be included at the site for supporting the expected workload in compliance with the at least one performability parameter.

According to at least one embodiment, a method comprises receiving, into a capacity planning tool, workload information representing an expected workload of client accesses of streaming media files over a period of time T. The method further comprises the capacity planning tool determining, for at least one media server configuration under evaluation, an amount of overload encountered by the at least one media server configuration during each of a plurality of time intervals of the expected workload.

According to at least one embodiment, a method comprises receiving, into a capacity planning tool, workload information identifying an expected workload of client accesses of streaming media files from a server over a period of time T. The method further comprises determining, by the capacity planning tool, an interval overload profile for a media server configuration under evaluation, wherein the interval overload profile specifies an amount of overload of the media server configuration for each of a plurality of time intervals of duration I of the expected workload, where I<T. The method further comprises the capacity planning tool determining, based at least in part on the interval overload profile whether the media server configuration under evaluation supports the expected workload in compliance with defined service parameters that define service characteristics desired by a service provider.

According to at least one embodiment, a system comprises means for receiving workload information representing an expected workload of client accesses of streaming media files from a site over a period of time T. The system further comprises means for determining, for at least one media server configuration under evaluation, an amount of overload encountered by the at least one media server configuration during servicing each of a plurality of time intervals of the expected workload.

According to at least one embodiment, a system comprises a media profiler operable to receive workload information for a service provider's site and generate a workload profile for a server configuration under consideration for supporting the service provider's site. The system further comprises a capacity planner operable to receive the generated workload profile for the server configuration under consideration and determine how many servers of such server configuration are needed to provide a media server solution having sufficient capacity for supporting the site's workload in compliance with defined performability parameters that specify a desired limit on degradation of quality of service provided by the media server solution during periods of degraded service.

BRIEF DESCRIPTION OF THE DRAWINGS

FIG. 12 shows an operational flow diagram of one embodiment for using a capacity planning tool;

FIG. 13 shows, in greater detail, an operational flow diagram of an example implementation of an embodiment for determining one or more media server configurations having sufficient capacity for supporting an expected workload of a service provider in compliance with defined service parameters; and FIG. 14 shows an example computer system adapted to provide an embodiment of a capacity planning system.

DETAILED DESCRIPTION OF THE INVENTION

Figure 1:
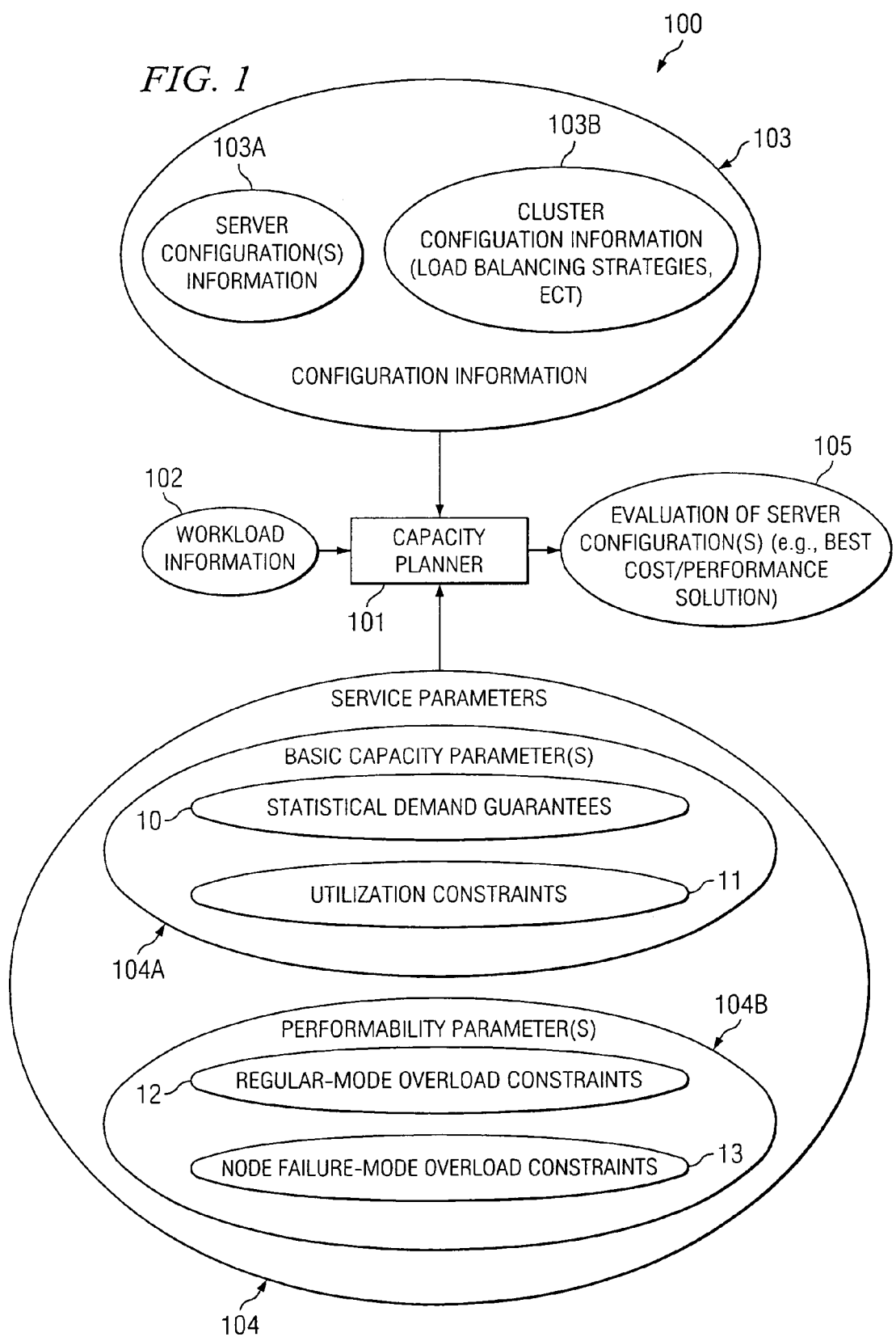
FIG. 1 shows a block diagram of an example embodiment of a capacity planning tool.

Various embodiments of a capacity planning tool (which may also be referred to herein as a "server configuration evaluator") are now described with reference to the above figures, wherein like reference numerals represent like parts throughout the several views. Co-pending and commonly assigned U.S. patent application Ser. No. 10/738,273 filed Dec. 17, 2003 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD" (the disclosure of which is incorporated herein by reference) provides a capacity planning tool that is operable to determine how many servers of a particular configuration under consideration are needed for forming a cluster of such servers for supporting the expected workload in a desired manner. More specifically, in accordance with at least one embodiment of the capacity planning tool disclosed therein, such capacity planning tool is operable to evaluate an expected workload (e.g., based on past collected access logs for a service provider's site) to determine a number of servers of a given configuration that may be clustered together to form a proper media server configuration for supporting the service provider's expected workload in a desired manner. In accordance with at least one embodiment, a service provider may define certain service parameters that are taken into account by the capacity planning tool in its determination of the proper media server configuration. For example, the service provider can specify certain Statistical Demand Guarantees (e.g., "based on the past workload history, find an appropriate performance solution that 95% of the time is capable of processing the applied load") and/or Utilization Constraints (e.g., "based on the past workload history, find an appropriate performance solution that 90% of the time is utilized under 70% of its capacity"), which are taken into consideration by the capacity planning tool in determining the proper media server configuration. These Statistical Demand Guarantees and Utilization Constraints are referred to herein as "Basic Capacity Parameters."

Embodiments of a capacity planning tool described herein further allow for the service provider to specify service parameters that define limits as to the amount of service degradation experienced during "non-compliant" periods (periods during which the media server configuration is overloaded). While the Basic Capacity planning process (using the Statistical Demand Guarantees and Utilization Constraints) derives a desirable configuration by sizing the system according to the main performance requirements for the compliant time, it does not provide any guarantees or limits regarding the degradation of the quality of service provided during non-compliant times. For example, in accordance with a Statistical Demand Guarantee that specifies a desired performance solution as one that is capable of processing the applied load with no performance degradation 95% of the time, a media server configuration determined based on this Basic Capacity planning does not provide any guarantees or limits on how "bad" the system performance could be in the remaining 5% of non-compliant time. Further, this does not specify any limits regarding the amount of performance degradation that may be encountered during periods of failure of one or more nodes of a multi-node clustered solution. Embodiments of the capacity planning tool described herein allow a service provider to specify certain service parameters (referred to herein as "Performability Parameters") that define limits on how "bad" the system performance may be during the non-compliant time periods (e.g., during periods of performance degradation resulting, for example, from overload and/or node failure in a multi-node cluster system).

Accordingly, in certain embodiments of the capacity planning tool described further herein, the service provider can specify the desirable system performance by stating two types of service parameters (e.g., in a Service Level Agreement (SLA)): 1) Basic Capacity Parameters that define the percentage of time the configuration is capable of processing the workload without performance degradation while satisfying the specified system utilization; and 2) Performability Parameters that define the acceptable degradation of service performance during the remaining, non-compliant time and in case of node failures. Such capacity planning tool may be used, for example, in a scenario in which a service provider, supporting a busy media site, faces a necessity to migrate the site to a new, more efficient infrastructure. More specifically, the capacity planning tool may be used in aiding the service provider in selecting the most appropriate media server configuration to implement in order to achieve the performance desired (in compliance with the defined service parameters).

As described further below, certain embodiments of a capacity planning tool utilize an interval analysis technique. For instance, the capacity planning tool receives workload information representing an expected workload of client accesses of streaming media files over a period of time T. The capacity planning tool then determines, for at least one media server configuration under evaluation, an amount of overload encountered by the at least one media server configuration during each of a plurality of time intervals of the expected workload. In certain embodiments, the capacity planning tool determines an interval overload profile for a media server configuration under evaluation, wherein the interval overload profile specifies an amount of overload of the media server configuration for each of a plurality of time intervals of duration I of the expected workload. Thus, the type of overload encountered by the media server configuration under the expected workload can be evaluated, such as determining whether an overload that is substantially continuous for a given interval of time (e.g., 1 hour) is encountered in supporting the expected workload. While it may be helpful to understand that a given media server configuration is overloaded for, say, 5% of the time in supporting the expected workload, it may be further helpful, from a quality of service (QoS) analysis, to understand whether that 5% of overload period comprises short-period bursts of overloads or longer periods of continuous overload. Thus, the capacity planning tool may use the interval overload profile determined for a media server configuration under evaluation to evaluate the type of degradation in quality of service that is encountered during periods of overload.

FIG. 1 shows a block diagram of an example embodiment of a capacity planning tool. As shown, system 100 includes capacity planner 101, which is capable of receiving input information regarding at least one server configuration and an expected (or "forecast") workload. Capacity planner 101 is further operable to make an evaluation of such server configuration(s) under the expected workload, as described further below.

In certain embodiments described below, capacity planner 101 is capable of determining how many servers of a particular configuration under consideration are needed for forming a cluster of such servers for supporting the expected workload in a desired manner. More specifically, for a given server (or "node") configuration, capacity planner 101 is operable to determine the number of such servers (or "nodes") that are needed for supporting the expected workload in a desired manner. For certain expected workloads, a single server may be capable of supporting such workloads in a desired manner. Thus, clustering of a plurality of such servers may be unnecessary for achieving the desired capacity. However, a single server configuration may not be capable of supporting certain other workloads (e.g., the workloads may overload the single server). That is, a site's expected workload may be too great to be adequately supported in the manner desired by the service provider by a single server. In the cases in which a single server is unable to support the expected workload in a desired manner, a plurality of such servers may be clustered together to increase the capacity of the resulting cluster. As described further below, in certain embodiments capacity planner 101 is operable to take into consideration one or more load balancing strategies (e.g., round-robin, etc.) that may be used by the cluster.

Thus, capacity planner 101 can aid a service provider in determining a proper media server configuration to be implemented for supporting its expected workload. For instance, in certain embodiments a service provider specifies a) configuration information 103 for one or more server configuration types and b) desired service parameters 104 that a resulting media server is to satisfy under the expected workload 102, and capacity planner 101 determines how many of such servers of each specified configuration type are to be clustered together for supporting the service provider's expected workload in the desired manner (in accordance with the specified service parameters 104). In certain embodiments, a service provider specifies a given server configuration(s) 103A and load balancing strategy 103B desired to be utilized, and capacity planner 101 further uses this information in determining how many of such servers of the specified configuration type are to be clustered together for supporting the service provider's expected workload in a desired manner (i.e., in accordance with service parameters 104) when the specified load balancing strategy (e.g., round-robin) is utilized for the cluster. Thus, the service provider can intelligently determine how many servers of the specified configuration type to implement in the media server cluster for supporting the service provider's site.

In certain embodiments, capacity planner 101 evaluates a plurality of different server configurations and/or a plurality of different load balancing strategies to determine various different solutions that are each capable of supporting the service provider's expected workload in a desired manner (e.g., in accordance with certain service parameters 104, as discussed further below). For instance, capacity planner 101 may determine that each of the following media server configurations are capable of supporting the service provider's expected workload in the manner desired by the service provider: 1) a cluster of 4 servers of configuration type A using load balancing strategy X; 2) a cluster of 5 servers of configuration type A using load balancing strategy Y; 3) a cluster of 7 servers of configuration type B using load balancing strategy X; 4) a cluster of 10 servers of configuration type B using load balancing strategy Y; etc. The service provider may then compare the monetary costs, as well as other characteristics, of each solution (i.e., each media server configuration), to identify an optimal solution for its site. In certain embodiments, capacity planner 101 includes monetary cost information for each server configuration such that it is capable of making this comparison for the service provider. In this manner, and as described further below, capacity planner 101 greatly aids a service provider in intelligently determining a media server configuration to be implemented for supporting the service provider's expected workload in the manner desired by the service provider.

In the example of FIG. 1, workload information 102 is received by capacity planner 101. Such workload information may comprise information about a workload of client accesses to one or more streaming media files being served by a media server. In certain implementations the workload information may be actual past access logs collected by a service provider, or it may be an estimated workload that is expected. For instance, media service providers typically collect media server access logs, which reflect processed client requests and client activities at the site. A log of client accesses over a past period of say, 3 months to a year, may provide a representative "view" of the service provider's regular workload, and thus may be used as an "expected" workload for the service provider. From such a log of client accesses, a determination can be made as to the number of concurrent client accesses to a streaming media file from a media server at any given point in the time period for which client accesses were logged. As described further below in conjunction with FIG. 2, in certain embodiments such access log information may be processed to generate a workload profile for the service provider, and the generated workload profile may be used by capacity planner 101 in evaluating a server configuration under consideration.

Further, capacity planner 101 may receive configuration information 103, such as server configuration information 103A (which may be referred to herein as "system configuration information" or "node configuration information") and cluster configuration information 103B shown in the example of FIG. 1. Cluster configuration information 103B may include information about different configurations for clusters that may be used in implementing a clustered media server, such as different load balancing strategies (e.g., round-robin, LARD, etc.) that may be employed for a cluster. Server configuration information 103A may comprise information about one or more server (or "node") configurations, such as the respective memory size, disk configuration and speed, processor speed, bandwidth, etc. for a corresponding server configuration. In certain implementations, the server configuration information 103A may also include monetary cost information (or "price") of a corresponding server configuration. Such monetary cost information may be used by capacity planner 101 in certain implementations for evaluating server configurations to determine a most cost-effective media server configuration (e.g., a single server configuration or cluster of a plurality of server configurations) that is capable of supporting the received workload in a manner desired by the service provider (e.g., in accordance with defined service parameters, such as those discussed further below).

As described further below, server configuration information 103A may also include benchmark information, such as the benchmark information described in co-pending and commonly assigned U.S. patent application Ser. No. 10/306,279 filed Nov. 27, 2002 entitled "SYSTEM AND METHOD FOR MEASURING THE CAPACITY OF A STREAMING MEDIA SERVER." U.S. patent application Ser. No. 10/306,279 entitled "SYSTEM AND METHOD FOR MEASURING THE CAPACITY OF A STREAMING MEDIA SERVER" discloses a set of benchmarks for measuring the basic capacities of streaming media systems. The benchmarks allow one to derive the scaling rules of server capacity for delivering media files which are: i) encoded at different bit rates, and ii) streamed from memory versus disk. As U.S. patent application Ser. No. 10/306,279 entitled "SYSTEM AND METHOD FOR MEASURING THE CAPACITY OF A STREAMING MEDIA SERVER" further describes, a "cost" function can be derived from the set of basic benchmark measurements. This cost function may provide a single value to reflect the combined resource requirement such as CPU, bandwidth, and memory to support a particular media stream depending on the stream bit rate and type of access (e.g., memory file access or disk file access).

Further, capacity planner 101 may receive service parameters 104, which may include Basic Capacity Parameter(s) 104A and/or Performability Parameter(s) 104B, as shown. Service parameters 104 define certain characteristics of the type of service desired to be provided by the service provider under the expected workload. In general, Basic Capacity Parameter(s) 104A define the type of service desired to be provided by the service provider under normal/expected conditions or during "compliant" periods, while Performability Parameter(s) 104B define the type of service desired to be provided by the service provider during non-compliant periods (e.g., periods of degraded performance resulting, for example, from overload and/or failure of one or more nodes of a clustered media server, etc.). Thus, Basic Capacity Parameter(s) 104A allow a service provider to specify the basic level of service desired during normal operating conditions, while Performability Parameter(s) 104B allow a service provider to limit the amount of degradation in quality of service provided during abnormal or "non-compliant" periods, such as limiting the amount of quality of service degradation that is encountered during periods of overload and/or during periods of failed nodes of a clustered media server.

Basic Capacity Parameter(s) 104A may include Statistical Demand Guarantees 10 and/or Utilization Constraints 11. Statistical Demand Guarantees 10 may include information identifying a percentage of time in which the media server solution is not overloaded under the expected workload, such as the desired media server configuration is one capable of supporting the expected workload at least X % (e.g., 99%) of the time. For example, Statistical Demand Guarantees 10 may, in some instances, specify that when presented the expected workload, the desired server configuration is overloaded to the point that it is unable to support the number of concurrent streams that it is serving (thus degrading the quality of service of one or more of those streams) no more than 1% of the time. Utilization Constraints 11 may include information restricting, for example, the amount of time that the desired media server configuration is at or near its capacity under the expected workload. For example, a Utilization Constraint may be defined specifying that the media server configuration desired by the service provider is utilized under 70% of its capacity for at least 90% of the time under the expected workload. Such Utilization Constraint may, for example, allow the service provider to define a certain amount of over-capacity into the desired server configuration to enable future growth of the workload to be supported by the server.

Performability Parameter(s) 104B may include Regular-Mode Overload Constraints 12 and/or Node-Failure-Mode Constraints 13. Regular-Mode Overload Constraints 12 define a limit as to the amount of degradation in service that is to be encountered during non-compliant times periods of performance degradation of regular system operation (i.e., with no node failures encountered in a clustered solution). Node-Failure-Mode Constraints 13 define a limit as to the amount of degradation in service that is to be encountered during periods in which one or more nodes of a clustered media server have failed. The service parameters 104 may, in certain implementations, be variables that can be defined by a service provider.

As described further below, capacity planner 101 is operable to evaluate one or more server configuration types and determine a number of such server configuration types that is capable of supporting the expected workload 102 in compliance with the Basic Capacity Parameter(s) 104A and the Performability Parameter(s) 104B. For instance, in certain embodiments, capacity planner 101 performs basic capacity planning, by taking into account the Basic Capacity Parameter(s) 104A, to determine a desirable media server configuration. Capacity planner 101 then performs performability capacity planning, by taking into account the Performability Parameter(s) 104B, to evaluate and refine the media server configuration determined in the basic capacity planning to ensure that the media server solution complies not only with the Basic Capacity Parameter(s) 104A, but also with the Performability Parameter(s) 104B. In certain embodiments, capacity planner 101 further performs a validation operation to validate the cluster size of the determined media server configuration. If the media server configuration determined by the basic capacity planning and performability capacity planning processes is a single server (single node) configuration, then the capacity planning procedure is completed. Otherwise, capacity planner 101 performs an additional refinement of the cluster sizing by evaluating the impact of the load balancing solution, such as round-robin, as well as the implications of the increased overall cluster memory.

Capacity planner 101 is operable to evaluate one or more configurations 103, such as may be identified by server configuration information 103A and/or cluster configuration information 103B, under the received workload 102, and capacity planner 101 outputs an evaluation 105 of such one or more media server configurations. More specifically, evaluation 105 may include an evaluation of the capacity of one or more media server configurations formed using the one or more server configurations under consideration for supporting the expected workload 102. For instance, such evaluation 105 may identify a plurality of different media server configurations that are each capable of supporting workload 102 in accordance with the defined service parameters 104. For example, suppose that server configuration information 103A includes information for two different server configuration types, A and B, and cluster configuration information 103B includes information specifying that a round-robin load balancing strategy is to be used for a cluster; in certain embodiments, capacity planner 101 outputs evaluation 105 identifying the following different media server configurations that are each capable of supporting a service provider's expected workload 102 in accordance with the defined service parameters 104: 1) a cluster of 4 servers of configuration type A using load balancing strategy; and 2) a cluster of 7 servers of configuration type B using the round-robin load balancing strategy. Further, in certain implementations, evaluation 105 may provide a comparison of the capacities of the various different media server configurations for supporting the expected workload 102, as well as the monetary cost of each media server configuration. From this information, a service provider may make an informed decision regarding the best media server configuration to be implemented for supporting the service provider's future workload. For instance, the service provider may, in certain implementations, determine the most cost-effective media server configuration, which may be a single server of a particular configuration type or a cluster of servers of a particular configuration type that use a certain load balancing strategy (e.g., round-robin) for supporting the expected workload in a desired manner (i.e., in accordance with the service provider's specified service parameters 104).

For evaluating the capacity of a server configuration under the expected workload, certain embodiments provided herein use a "cost" function for evaluating the amount of resources of the server configuration that are consumed under the workload. That is, in certain embodiments capacity planner 101 is operable to compute a "cost" in terms of server resources consumed for supporting the workload. This cost function, which is described further below in conjunction with the example of FIG. 2, may provide a single value to reflect the combined resource requirement such as CPU, bandwidth, and memory to support a particular media stream depending on the stream bit rate and type of access (e.g., memory file access or disk file access). In general, this cost function is used to compute the cost (in terms of resources consumed) of serving a stream (request) depending on its type: 1) its encoding bit rate, and 2) its access type (memory versus disk). Capacity planner 101 can evaluate the computed cost of a given server configuration to evaluate whether the server configuration can support the workload in accordance with the service parameters 104.

The ability to plan and operate at the most cost effective capacity provides a desirable competitive advantage for many streaming media service providers. Consider, for example, a scenario where a service provider, supporting a busy media site, faces a necessity to migrate the site to a new, more efficient infrastructure. For example, it may be determined that the service provider's current media server configuration is unable to adequately support the service provider's regular workload, and thus a new media server configuration is desired. The challenge becomes determining the optimal or most cost-effective infrastructure for the service provider to implement. On the one hand, the service provider typically desires to implement a media server configuration that is capable of supporting the service provider's workload (at least for a majority of the time) such that a desired quality of service is maintained for the streams that it serves. However, the service provider also typically desires to minimize the monetary cost of the media server configuration. Thus, the service provider typically does not wish to select a media server configuration that will be capable of supporting the service provider's workload at a cost of $X dollars, while a media server configuration that costs much less would be capable of supporting the service provider's workload just (or almost) as well. The service provider traditionally has no tool for evaluating the manner in which each of the media server configurations being considered would support the service provider's expected workload. Thus, the service provider traditionally makes a relatively uninformed decision regarding which media server configuration to implement for supporting the service provider's site.

Typically, the relationship between various media server configurations and their respective abilities to support a service provider's workload is not fully understood or appreciated by the service provider, thereby making the decision of selecting a media server configuration difficult. For instance, service provider's traditionally have not had a tool for determining a media server configuration(s) that is/are capable of supporting the service provider's expected workload in a given manner (e.g., in accordance with certain service parameters defined by the service provider). Accordingly, a capacity planning tool, such as capacity planner 101 of FIG. 1, that is capable of evaluating media server configurations for a workload and provide feedback regarding the capacity of such configurations for supporting the workload and/or identifying the most cost-effective configuration is a beneficial tool for service providers. Particularly considering the great amount of flexibility and control that the various embodiments of capacity planner 101 described further herein provide to a service provider in, for example, defining desired service parameters with which a resulting media server configuration is to comply, the embodiments of capacity planner 101 described herein advantageously provides capacity planning assistance previously unavailable to a service provider.

Figures 2, 3:
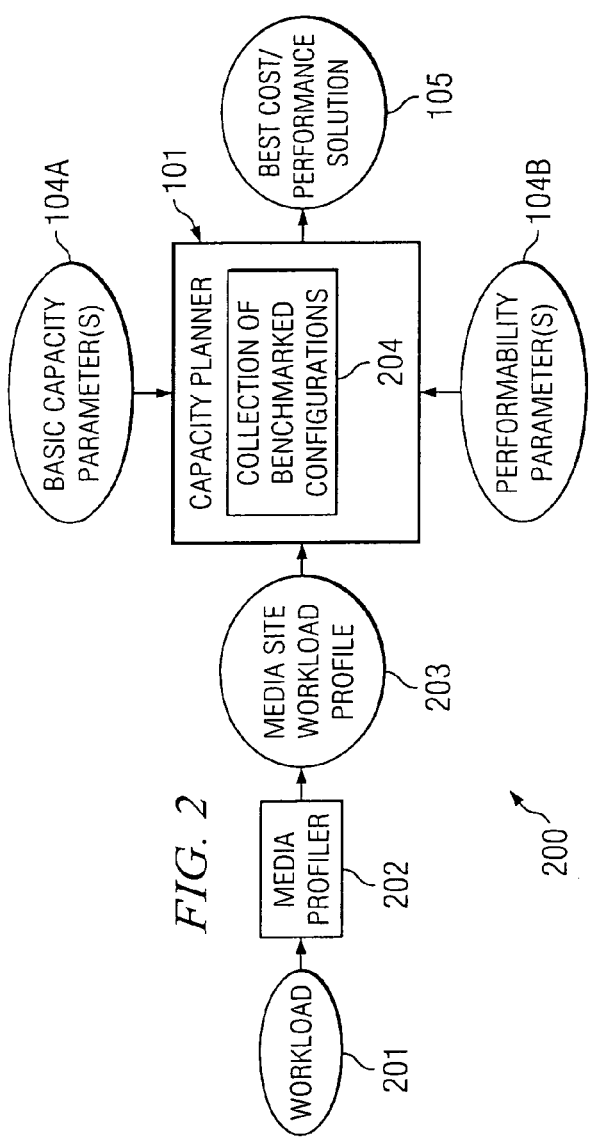
FIG. 2 shows a block diagram of another example embodiment of a capacity planning tool.
FIG. 3 shows one example of a workload profile that may be generated by a media profiler in accordance with one embodiment.

Turning to FIG. 2, a block diagram of another example embodiment of a capacity planning tool is shown. As with the example embodiment of FIG. 1, system 200 includes capacity planner 101, which may receive, as input, service parameters defining certain characteristics of the type of service desired to be provided by the service provider under the expected workload, such as Basic Capacity Parameters 104A and Performability Parameters 104B.

In the example of FIG. 2, a media profiler 202 (referred to herein as "MediaProf") is implemented. Such MediaProf 202 receives workload information 201 and generates a workload profile 203 for the service provider's workload. As mentioned above, media service providers typically collect media server access logs, which reflect processed client requests and client activities at the service provider's site. In the example of FIG. 2, workload 201 comprises such an access log (which may be from a single server or from a cluster of server's at the service provider's site, depending on the service provider's current media server configuration) for an elapsed period of say, 3 months to a year. The access log may include information for any suitable elapsed period of time that is sufficiently long to provide a representative "view" of the service provider's regular (or typical) workload. Alternatively, workload 201 may be a synthetic or estimated workload that is representative of the workload expected for the service provider's site.

MediaProf 202 receives this workload information (e.g., access log) 201 and processes such workload information 201 to generate a workload profile 203 for the service provider. Such workload profile 203 is then received by capacity planner 101 and used thereby for evaluating one or more server configurations under consideration. In certain implementations, MediaProf 202 processes the access log collected for a service provider's site to characterize the site's access profile and its system resource usage in both a quantitative and qualitative way in the workload profile 203. Examples of workload profile 203 that may be generated by MediaProf 202 according to certain implementations are described further below in conjunction with FIGS. 3 and 4. As described further with FIGS. 3 and 4, in certain embodiments workload profile 203 identifies the access types of requests (e.g., memory versus disk) in the workload for a given server configuration under consideration. Thus, MediaProf 202 may generate a different workload profile 203 for different server configurations (e.g., having different memory sizes) for the given workload 201.

As further described herein, the workload profile is utilized in certain embodiments for performing "interval analysis." For instance, a given interval of time (e.g., 10 minutes, 30 minutes, 1 hour) may be specified and such interval may be evaluated throughout the workload profile to determine the capacity of a media server configuration under evaluation for supporting the workload during such interval. For example, windows of 1 hour intervals that are spaced 1 minute apart (and are thus overlapping) in the workload profile may each be evaluated to determine whether the media server configuration under evaluation services such interval of workload in accordance with defined service parameters 104 (e.g., performability parameters 104B). Thus, a determination can be made whether any 1-hour interval of the workload profile fails to comply with the specified service parameters 104.

In the example embodiment of FIG. 2, capacity planner 101 has the ability to measure and to compare the capacities of different media server configurations. More specifically, in this example embodiment capacity planner 101 uses a cost function for evaluating the capacities of various different server configurations under the workload. As mentioned above, a technique for measuring server capacity using a cost function is disclosed in co-pending U.S. patent application Ser. No. 10/306,279 entitled "SYSTEM AND METHOD FOR MEASURING THE CAPACITY OF A STREAMING MEDIA SERVER." Also, a technique for measuring server capacity using a cost function is described by L. Cherkasova and L. Staley in "Building a Performance Model of Streaming Media Applications in Utility Data Center Environment", *Proc. of ACM/IEEE Conference on Cluster Computing and the Grid (CCGrid)*, May, 2003 (hereinafter referred to as "the L. Cherkasova Paper"), the disclosure of which is hereby incorporated herein by reference. The above references introduce a basic benchmark that can be used to establish the scaling rules for server capacity when multiple media streams are encoded at different bit rates. For instance, a basic benchmark may be executed for each of various different encoding bit rates for files stored at a media server.

A media server (which may be either a single server or a cluster of servers) may comprise streaming media files that are encoded for transmission at each of a plurality of different bit rates. For example, a first streaming media file, "File A,"

may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage of the media server and the media server may be able to serve the appropriate one of such files as a stream to a client. In this case, the different encoded files comprise substantially the same content (i.e., the content of File A), but are encoded for transmission at different bit rates, and thus the quality of each file may differ. A media server generally attempts to serve the most appropriate encoded file to a client based at least in part on the client's access speed to the client-server network. For example, suppose a first client has a 28 Kb/s speed connection to the communication network (e.g., the Internet), a second client has a 56 Kb/s speed connection to the communication network, and a media server comprises File $A_1$ encoded at 28 Kb/s and File $A_2$ encoded at 56 Kb/s stored thereto; when the first client requests the content of File A, the media server typically attempts to serve File $A_1$ to this first client (as File $A_1$ is the highest-quality encoded file supportable by the first client's connection speed), and when the second client requests the content of File A, the media server typically attempts to serve File $A_2$ to this second client (as File $A_2$ is the highest-quality encoded file supportable by the second client's connection speed).

As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

As shown in the example of FIG. 2, capacity planner 101 may have stored thereto (e.g., to a data storage device, such as random access memory (RAM), hard disk, optical disk drive, etc., which is communicatively accessible by capacity planner 101) server configuration information 204, such as server configuration information 103A in the example of FIG. 1. Although not specifically shown in FIG. 2, capacity planner 101 may also include cluster configuration information 103B of FIG. 1. In this example, server configuration information 204 includes benchmark information for various different server configurations, such as the benchmark information described in co-pending U.S. patent application Ser. No. 10/306,279 entitled "SYSTEM AND METHOD FOR MEASURING THE CAPACITY OF A STREAMING MEDIA SERVER." An objective of the basic benchmark according to one embodiment is to define how many concurrent streams of the same bit rate can be supported by the corresponding server configuration without degrading the quality of any streams.

In accordance with one embodiment, the basic benchmark comprises two types of benchmarks:
1) Single File Benchmark measuring a media server capacity when all the clients in the test workload are accessing the same file, and
2) Unique Files Benchmark measuring a media server capacity when each client in the test workload is accessing a different file.

Each of these benchmarks have a set of sub-benchmarks with media content encoded at a different bit rate. In one performance study that we have conducted, the following six bit rates that represent the typical Internet audience were used: 28 Kb/s, 56 Kb/s, 112 Kb/s, 256 Kb/s, 350 Kb/s, and 500 Kb/s. Of course, the set of benchmarked encoding bit rates can be customized according to a targeted workload profile, and thus other encoding bit rates instead of or in addition to those of our performance study may be used in various embodiments.

Thus, a Single File Benchmark (SFB) may be executed for each of various different encoding bit rates for files stored at a server configuration under evaluation. The SFB measures the server capacity when all of the clients in the test are accessing the same file. That is, the result of the SFB for a particular encoding bit rate defines the maximum number of concurrent streams of a single file encoded at that particular bit rate that the corresponding server configuration can support. Example techniques for executing SFBs for a media server are described further in co-pending U.S. patent application Ser. No. 10/306,279 entitled "SYSTEM AND METHOD FOR MEASURING THE CAPACITY OF A STREAMING MEDIA SERVER." In this example embodiment of FIG. 2, an SFB is determined for each of various different server configurations, and such SFB determined for each server configuration is included in the collection of benchmarks 204.

Similarly, a Unique Files Benchmark (UFB) may be executed for each of various different encoding bit rates for files stored at a server configuration under evaluation. The UFB measures the server capacity when all of the clients in the test are accessing different files. That is, the result of a UFB for a particular encoding bit rate defines the maximum number of concurrent streams, each of different files that are encoded at the particular bit rate, that the corresponding server configuration can support. Example techniques for executing UFBs for a media server are described further in co-pending U.S. patent application Ser. No. 10/306,279 entitled "SYSTEM AND METHOD FOR MEASURING THE CAPACITY OF A STREAMING MEDIA SERVER." In an example embodiment of FIG. 2, a UFB is determined for each of various different server configurations, and such UFB determined for each server configuration is included in the collection of benchmarks 204.

When all of a media server's clients are accessing a single file (as measured by the SFB), the media server is capable of serving the currently streamed bytes of the file from memory. However, when all of its clients are accessing a different file (as measured by the UFB), the media server serves each file from disk. Thus, the SFB is essentially a best-case scenario benchmark, whereas the UFB is essentially a worst-case scenario benchmark for a corresponding server configuration under consideration.

Using an experimental testbed with standard components available in a Utility Data Center environment and proposed set of basic benchmarks, the capacity and scaling rules of a media server running RealServer 8.0 from RealNetworks was measured in the L. Cherkasova Paper. The measurement results reported in the L. Cherkasova Paper show that these scaling rules are non-trivial. For example, the difference between the highest and lowest bit rate of media streams used in those experiments was 18 times. However, the difference in maximum number of concurrent streams a server is capable of supporting for corresponding bit rates is only around 9 times for an SFB, and 10 times for a UFB. Modern media servers, such as RealServer 8.0, rely on the native operating system's file buffer cache support to achieve higher application throughput when accessed files are streamed from memory. The measurements indicate that media server performance is approximately 3 times higher (and for some disk/file subsystems, up to 7 times higher) under the SFB than under the UFB. This quantifies the performance benefits for multimedia applications when media streams are delivered from memory versus from disk.

Capacity planner 101 uses the benchmarks for the various different server configurations to evaluate those server configurations under the received workload information (e.g., the workload profile 203). For evaluating the capacity of a server configuration under the expected workload, certain embodiments of a capacity planner use a "cost" function for evaluating the amount of resources of the corresponding server configuration under consideration that are consumed under the workload. As described in co-pending U.S. patent application Ser. No. 10/306,279 entitled "SYSTEM AND METHOD FOR MEASURING THE CAPACITY OF A STREAMING MEDIA SERVER" and in the L. Cherkasova Paper, a set of basic benchmark measurements for a server configuration may be used to derive a cost function that defines a fraction of system resources of such media server configuration that are needed to support a particular media stream depending on the stream bit rate and type of access (memory file access or disk file access), including the following costs:

A) $cost_{X_i}^{disk}$—a value of cost function for a stream with disk access to a file encoded at $X_i$ Kb/s. If we define the server configuration capacity being equal to 1, the cost function is computed as $cost_{X_i}^{disk} = 1/N_{X_i}^{Unique}$, where $N_{X_i}^{Unique}$ is the maximum measured server capacity in concurrent streams under the UFB of the corresponding server configuration under consideration for a file encoded at $X_i$ Kb/s; and B) $cost_{X_i}^{memory}$—a value of cost function for a stream with memory access to a file encoded at $X_i$ Kb/s. Let $N_{X_i}^{Single}$ be the maximum measured server capacity in concurrent streams under the SFB of the corresponding server configuration under consideration for a file encoded at $X_i$ Kb/s, then the cost function is computed as $$cost_{X_i}^{memory} = (N_{X_i}^{Unique} - 1)/(N_{X_i}^{Unique} \times (N_{X_i}^{Single} - 1)).$$

Let W be the current workload processed by a media server, where a) $X_w = X_1, \ldots X_{k_w}$ is a set of distinct encoding bit rates of the files appearing in $W(X_w \subseteq X)$;

b)

$$N_{X_{W_i}}^{memory}$$

is a number of streams having a memory access type for a subset of files encoded at $X_{W_i}$ Kb/s; and c)

$$N_{X_{W_i}}^{disk}$$

is a number of streams having a disk access type for a subset of files encoded at $X_{W_i}$ Kb/s.

Then, the service demand, "Demand," to a media server under workload W can be computed by the following capacity equation:

$$\text{Demand} = \sum_{i=1}^{K_W} N_{X_{W_i}}^{memory} \times cost_{X_{W_i}}^{memory} + \sum_{i=1}^{K_W} N_{X_{W_i}}^{disk} \times cost_{X_{W_i}}^{disk} \quad (1)$$

If Demand≦1 then a single-server configuration of the media server operates within its capacity, and the difference 1−Demand defines the amount of available server capacity. On the other hand, if Demand>1 then the single-server configuration of the media server is overloaded and its capacity is exceeded. For example, when the computed service demand is Demand=4.5, this indicates that the considered workload (media traffic) requires 5 nodes (of the corresponding server configuration) to be supported in the desired manner. In accordance with certain embodiments, media site workload profile 203 and cost functions of different media server configurations may be used by capacity planner 101 for computing the service demand, Demand, using the capacity equation (1) above, and the computed results may be compared (by capacity planner 101 and/or by a service provider) to choose the best cost/performance configuration.

As described further below, in certain embodiments, an iterative approach is used by capacity planner 101 for determining media server configuration(s) that are capable of supporting the workload in a desired manner. For instance, capacity planner 101 may first use the benchmarks (SFB and UFB) and cost function for a given server configuration (i.e., a server having a particular size memory, etc.) to compute the Demand for such server configuration (using the corresponding benchmarks and cost function for this server configuration). If the Demand indicates that more than one of the servers of this configuration type is required for supporting the expected workload, capacity planner 101 then re-evaluates the expected workload for a clustered media server configuration having the number of servers indicated by the Demand. For instance, if when evaluating the capacity of a single server of a particular configuration type under consideration the Demand=4.5 (indicating that a cluster of 5 nodes of such server configuration type under consideration is needed for supporting the expected workload), capacity planner 101 re-evaluates the capacity of a clustered media server having the resources (e.g., amount of memory, etc.) of 5 of the servers of the configuration type under consideration. Capacity planner 101 then determines the media site workload profile 203 for such a clustered media server (because the workload profile 203 for the clustered media server may differ from the workload profile 203 initially determined for the single server configuration, e.g., because of the increased memory resources in the cluster certain accesses determined for the single server configuration as being disk accesses may now be memory accesses), and capacity planner 101 uses such determined workload profile 203 for the media cluster to compute the Demand. If the Demand computed for the clustered media server configuration again indicates that 5 servers of the configuration type under consideration are needed, capacity planner 101 concludes that such a cluster of 5 nodes is the proper solution for this configuration type for supporting the expected workload. That is, the capacity planner verifies that a cluster of 5 nodes of this configuration type are indeed needed for supporting the workload in the manner desired by the service provider. However, if the Demand for the clustered media server configuration indicates that a different number of servers (i.e., fewer or more than 5 servers in this example) of the configuration type under consideration are needed, capacity planner 101 again re-evaluates the capacity for supporting the expected workload of a clustered media server having the resources (e.g., amount of memory, etc.) of the different number of servers. For instance, if the Demand for the clustered media server configuration indicates that 4, rather than 5, servers of the configuration type under consideration are needed, the capacity planner determines the media site workload profile 203 for such a clustered media server having 4 nodes, and capacity planner 101 uses such determined workload profile 203 for the media cluster to compute the Demand for the 4-node cluster. This iterative operation may continue until capacity planner 101 verifies that a particular media server configuration (e.g., a cluster of a given number of nodes) provides sufficient capacity for supporting the expected workload in the manner desired by the service provider (e.g., in accordance with the service parameters 104). This iterative technique is described further below in connection with FIGS. 6B and 11.

In certain embodiments, capacity planner 101 may determine the Demand for various different media server configurations. For instance, using a media site traffic profile 203, capacity planner 101 can compute the Demand the site needs to support, and then compare the computed results. For example, for a server configuration of type 1 and the corresponding cost functions, the computed service demand is Demand=1.3, i.e. the considered media traffic requires more than 1 node (e.g., 2 nodes) of type 1 for its support, and for another server configuration of type 2 and its corresponding cost functions the computed service demand is Demand=0.8, i.e. 1 node of type 2 can support the media site traffic. Thus, capacity planner 101 can, in certain embodiments, determine for each of various different server (or "node") configuration types whether a single one of such servers or a cluster of such servers is needed for supporting the expected workload in the manner desired by the service provider (e.g., in compliance with the specified service parameters 104).

The above-described cost function uses a single value to reflect the combined resource requirement such as CPU, bandwidth and memory to support a particular media stream depending on the stream bit rate and type of the file access (memory or disk access). The proposed framework provides a convenient mapping of a service demand (client requests) into the corresponding system resource requirements.

As mentioned with FIG. 2, a workload profile 203 that is based on the past workload history (e.g., access log) 201 of a service provider, may be generated by MediaProf 202 and used by capacity planner 101 in evaluating the capacity of one or more server configurations for supporting the service provider's workload. While it may be useful to understand how much traffic is serviced by the site in a particular time interval (e.g., per hour), this knowledge does not translate directly into capacity requirements for a proper media server configuration. For properly evaluating a media server configuration's capacity for supporting a workload, information concerning the number of simultaneous (concurrent) connections and the corresponding peak bandwidth requirements may be used by capacity planner 101.

As described further in co-pending U.S. patent application Ser. No. 10/738,273 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD," in the workload of many sites the amount of client requests and required bandwidth is highly variable over time, and such traffic is often "bursty" such that a large fraction of requests can be served from memory. Since a media server capacity is 3-7 times higher when media streams are delivered from memory versus from disk, such a qualitative media traffic classification and analysis directly translates in significant configuration savings.

In general, in accordance with at least one embodiment, MediaProf 202 processes the workload 201 (e.g., media server access logs) to generate workload profile 203 by: a) evaluating the number of concurrent connections at each moment of time, b) partitioning the concurrent connections into a predefined set of bit rate groups, and c) classifying the concurrent connections by the file access type: memory versus disk. Operation of MediaProf 202 and the resulting workload profile 203 of certain embodiments of the present invention are described further below.

Since the amount of system resources needed to support a particular client request depends on the file encoding bit rate as well as the access type of the corresponding request, (i.e. different requests have a different resource "cost" as described above), MediaProf 202 provides a corresponding classification of simultaneous connections in the generated workload profile 203. FIG. 3 shows a first example workload profile 203 that may be generated by certain embodiments of MediaProf 202. As shown, the example workload profile 203 of FIG. 3 includes various points in time for which access information was collected in the access log of workload 201, such as time $T_1$. For each time point, the number of concurrent connections is identified. More specifically, the number of concurrent connections are categorized into corresponding encoding bit rates for the streaming media files accessed thereby. Further, the number of concurrent connections in each encoding bit rate category is further categorized into sub-categories of either memory or disk depending on whether the access was a memory access or a disk access. That is, MediaProf 202 may model whether a request in the workload can be serviced from memory or from disk for a given server configuration (e.g., a given memory size). For instance, the memory modeling technique disclosed in co-pending and commonly assigned U.S. patent application Ser. No. 10/601,956 titled "SYSTEM AND METHOD FOR MODELING THE MEMORY STATE OF A STREAMING MEDIA SERVER," may be used in certain embodiments. In certain implementations, MediaProf 202 may build different profiles for different memory sizes (e.g., different profiles 203 are constructed for different media server configurations that have different memory sizes). Note that a memory access does not assume or require that the whole file resides in memory. For example, if there is a sequence of accesses to the same file issued closely to each other on a time scale, then the first access may read a file from disk, while the subsequent requests may be accessing the corresponding file prefix from memory. A technique that may be used by MediaProf 202 in determining whether an access is from memory or from disk is described further below in conjunction with FIG. 5.

In the example workload profile of FIG. 3, 30 concurrent connections (or client accesses) are in progress at time $T_1$ for the media site under consideration. The 30 concurrent connections are categorized into 3 accesses of media file(s) encoded at 28 Kb/s, 2 accesses of media file(s) encoded at 56 Kb/s, 3 accesses of media file(s) encoded at 112 Kb/s, 7 accesses of media file(s) encoded at 256 Kb/s, 5 accesses of media file(s) encoded at 350 Kb/s, and 10 accesses of media file(s) encoded at 500 Kb/s. Again, embodiments are not limited to the six encoding bit rate categories of the example of FIG. 3, but rather other encoding bit rates may be used instead of or in addition to those of FIG. 3 (e.g., as may be tailored for the service provider's site/workload). Further, the 3 accesses of media file(s) encoded at 28 Kb/s are further sub-categorized into 2 memory accesses and 1 disk access. The 2 accesses of media file(s) encoded at 56 Kb/s are further sub-categorized into 0 memory accesses and 2 disk accesses. The 3 accesses of media file(s) encoded at 112 Kb/s are further sub-categorized into 3 memory accesses and 0 disk accesses. The 7 accesses of media file(s) encoded at 256 Kb/s are further sub-categorized into 6 memory accesses and 1 disk access. The 5 accesses of media file(s) encoded at 350 Kb/s are further sub-categorized into 5 memory accesses and 0 disk accesses, and the 10 accesses of media file(s) encoded at 500 Kb/s are further sub-categorized into 8 memory accesses and 2 disk accesses.

Figures 4, 5:
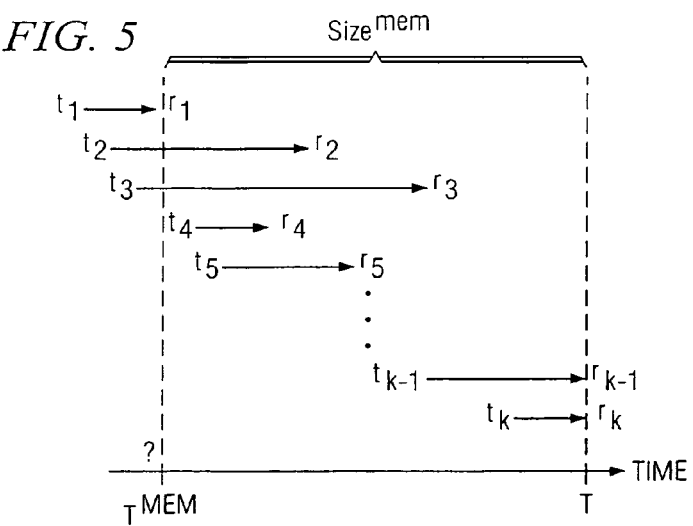
FIG. 4 shows another example of a workload profile that may be generated by a media profiler in accordance with one embodiment.
FIG. 5 shows an example of requests for file accesses that are made to a media server during an interval of time.

Another example workload profile 203 that may be generated by certain embodiments of MediaProf 202 is shown in FIG. 4. As shown, the example workload profile 203 of FIG. 4 includes various points in time for which access information was collected in the access log of workload 201, such as timestamps $t_i-1$, $t_i$, and $t_i+1$. In this example, the timestamps show when the media server state changes, e.g., i) the media server accepts a new client request (or multiple new requests) or ii) some active media sessions are terminated by the clients. For each timestamp, the number of concurrent connections is identified. In the example of FIG. 4, there are 100 concurrent connections at timestamp $t_i-1$, 104 concurrent connections at timestamp $t_i$, and 103 concurrent connections at timestamp $t_i+1$. As with the example of FIG. 3, the number of concurrent connections are categorized into corresponding encoding bit rates for the streaming media files accessed thereby. In the example of FIG. 4, the number of the concurrent connections at any given timestamp are categorized into those connections that are accessing streaming media files encoded at less than 56 Kb/s, those that are accessing streaming media files encoded at a rate from 56 Kb/s to 112 Kb/s, and those that are accessing streaming media files encoded at greater than 112 Kb/s.

For each of these categories, the connections are further categorized into sub-categories of either memory or disk depending on whether the access was a memory access or a disk access. As described above, MediaProf 202 may model whether a request in the workload can be serviced from memory or from disk for a given server configuration (e.g., a given memory size), such as with the memory modeling technique disclosed in co-pending and commonly assigned U.S. patent application Ser. No. 10/601,956 titled "SYSTEM AND METHOD FOR MODELING THE MEMORY STATE OF A STREAMING MEDIA SERVER." A technique that may be used by MediaProf 202 in determining whether an access is from memory or from disk is described further below in conjunction with FIG. 5.

Turning to FIG. 5, an example technique for MediaProf 202 determining an access type (i.e., whether memory or disk access) is now described. Let $Size^{mem}$ be the size of memory in bytes of a server configuration under consideration. For each request r in the media server access log of workload 201, information is included about the media file requested by r, the duration of r in seconds, the encoding bit rate of the media file requested by r, the time t when a stream corresponding to request r is started (which is reflected by r(t) herein), and the time when a stream initiated by request r is terminated.

Let $r_1(t_1)$, $r_2(t_2)$, . . . , $r_k(t_k)$ be a recorded sequence of requests to a media server. Given the current time T and request r(T) to media file f, MediaProf 202 may compute some past time $T^{mem}$ such that the sum of the bytes stored in memory between $T^{mem}$ and T is equal to $Size^{mem}$. Accordingly, the files' segments streamed by the media server between times $T^{mem}$ and T will be in memory at time T. In this way, MediaProf 202 can identify whether request r will stream file f (or some portion of it) from memory for a given server configuration under consideration.

In the specific example shown in FIG. 5, requests for file accesses that are made to a media server during the interval of time $t_1$ through time T is shown, wherein the interval from time $T^{mem}$ through time T can be determined that comprises the segments of accessed files that are currently stored to the media server's memory, which has size $Size^{mem}$. More specifically, accesses $r_1, r_2, \ldots, r_{k-1}, r_k$ are made during the time interval from time $t_1$ through the current time T.

As described further below, when a clustered media server configuration is considered, a dispatcher determines the requests of workload 201 that will be directed to each server of the cluster (in accordance with a load balancing strategy employed by the cluster), and considering memory size, $Size^{mem}$, of each server of the cluster, a determination is made whether each access is a memory type or a disk type. That is, the memory of each server in the cluster may be modeled in the manner described in connection with FIG. 5 to determine the corresponding access types (memory versus disk) for the requests of workload 201 that are serviced by each server of the cluster. As shown in the example of FIG. 5, the total size of the segments accessed is greater than the total size, $Size^{mem}$, of the media server's memory. Thus, depending on the type of memory management scheme implemented for the memory, some of the accessed segments are evicted from the memory. That is, not all of the accessed segments can be stored to memory because the segments' total size is greater than size $Size^{mem}$ of memory of the server configuration under consideration. Typically, a Least Recently Used (LRU) scheme is implemented for a media server, wherein the most recently accessed segments are stored to memory and the oldest (or least recently accessed) segments are evicted to make room for more recently accessed segments to be stored in memory. To determine the current contents of memory at time T, the time interval from time $T^{mem}$ to the time T in which unique file segments that have a size totaling size $Size^{mem}$ is determined by MediaProf 202 from the workload information 201.

Co-pending U.S. patent application Ser. No. 10/601,956 filed Jun. 23, 2003 entitled "SYSTEM AND METHOD FOR MODELING THE MEMORY STATE OF A STREAMING MEDIA SERVER," further describes an example technique for modeling the memory state of a streaming media server, and such memory modeling technique may be employed by MediaProf 202 in certain embodiments for efficiently determining the memory state of a server configuration that is under consideration. That is, MediaProf 202 may use such memory modeling technique for modeling accesses of the workload 201 for a media server configuration under consideration to generate a workload profile 203, such as the example workload profile of FIG. 3 or FIG. 4.

As described further in co-pending U.S. patent application Ser. No. 10/738,273 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD," in certain implementations, MediaProf 202 may build different profiles for different memory sizes (e.g., different profiles 203 are constructed for different server configurations that have different memory sizes).

In the example embodiment of FIG. 2, capacity planner 101 has a collection of benchmarked configurations 204 with the corresponding cost functions for different types of requests (i.e., requests serviced by memory versus requests serviced by disk). Capacity planner 101 receives the media site workload profile 203 (for a particular memory size) and using the cost functions of a particular media server configuration computes a corresponding service demand profile over time according to capacity equation (1) above. In certain embodiments, the service demand profile is computed for different memory sizes and different benchmarked configurations to enable capacity planner 101 to evaluate the capacity of a plurality of different media server configurations for supporting the expected workload. Examples of such a service demand profile that may be generated is described further in co-pending U.S. patent application Ser. No. 10/738,273 entitled "SYSTEM AND METHOD FOR DETERMINING HOW MANY SERVERS OF AT LEAST ONE SERVER CONFIGURATION TO BE INCLUDED AT A SERVICE PROVIDER'S SITE FOR SUPPORTING AN EXPECTED WORKLOAD."

Figure 6A:
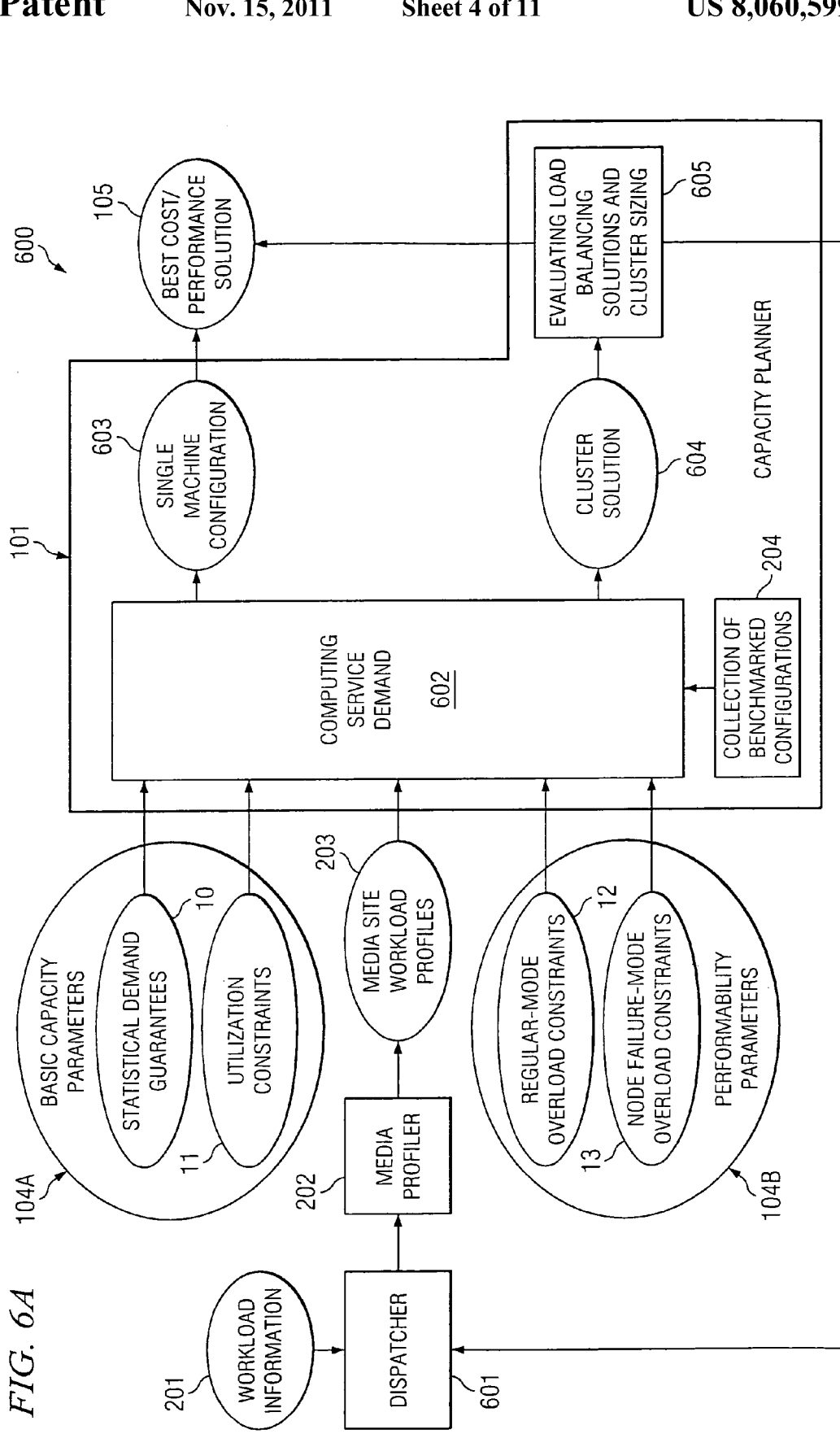
FIG. 6A shows an example of one embodiment of a capacity planning system for determining how many servers of a given configuration type are needed for supporting an expected workload.

Turning to FIG. 6A, one embodiment of a capacity planning system 600 is shown. In this example embodiment, workload information 201 (e.g., the collected media server access logs for a service provider's site) is input to MediaProf 202 (via dispatcher 601 in this example). MediaProf 202 generates Media site workload profiles 203 for each media server configuration under consideration, as described above. The generated workload profiles 203 are input to capacity planner 101. Additionally, service parameters such as Basic Capacity Parameters 104A and Performability Parameters 104B are input to capacity planner 101. More specifically, in this example, Statistical Demand Guarantees 10, Utilization Constraints 11, Regular-Mode Overload Constraints 12, and Node-Failure Mode Overload Constraints 13 are input to capacity planner 101. Using a collection of benchmarked configurations 204, as well as the received workload profiles 203, Basic Capacity Parameters 104A, and Performability Parameters 104B, capacity planner 101 computes, in block 602, a service Demand for each of the media server configurations under consideration in the manner described above.

For instance, for evaluating a first server configuration (e.g., having a given size of memory, etc.), capacity planner uses the corresponding benchmarks 204 (e.g., SFB and UFB) for such configuration along with the corresponding workload profile 203 (e.g., $MP_1$) for such configuration in computing the service Demand for that configuration in block 602. From the computed service Demand for this first server configuration, capacity planner 101 determines whether a single one of such first server configuration can support the workload in a desired manner (e.g., in a manner that complies with Basic Capacity Parameters 104A and Performability Parameters 104B). If determined that a single one of such first server configuration can support the workload in a desired manner, capacity planner identifies that such a media server configuration is suitable for supporting the workload in block 603.

However, if capacity planner 101 determines from the computed service Demand that a single one of the first server configuration under consideration is not capable of supporting the workload in the desired manner, capacity planner identifies in block 604 that a cluster of such first server configurations is needed. An initial determination of the number of nodes (i.e., the number of such first server configurations) to be included in the clustered media server solution is made from the computed service Demand. For example, if the computed service Demand for this first server configuration is 5 (or any number between 4 and 5, such as 4.5), then capacity planner 101 can initially determine that a cluster having 5 nodes is suitable for supporting the workload in the desired manner. Of course, this initial computation of the service Demand was made using the workload profile 203 generated for a single one of the first server configuration. Thus, while the initial computation of the service Demand is reliable for indicating whether a single one of the first server configuration is capable of supporting the workload or whether a cluster of such servers is needed, if the service Demand indicates that a cluster is needed, the specific number of nodes initially indicated by such service Demand (e.g., 5) may be less reliable because such number is estimated through an evaluation of the resources of a single one of the first server configuration (rather than an actual evaluation of the resources of a cluster having the estimated number of nodes and the type of load balancing strategy employed for such cluster). Accordingly, to verify that the initial indication of 5 nodes, in the above example, is accurate, capacity planner 101 re-computes the service Demand taking into consideration the resources and load balancing strategy of such a cluster.

As illustrated in the example of FIG. 6A, capacity planner 101 evaluates the load balancing strategy(ies) for the initially determined number of nodes (as indicated by the service Demand) in block 605. The resources of such cluster of nodes and the load balancing strategy(ies) are taken into account in generating a new workload profile 203. For instance, dispatcher 601 inputs identification of the resources of such a clustered media server, as well as identification of the load balancing strategy to be utilized by the cluster, into MediaProf 202, which generates the new workload profile 203 for such cluster.

Figure 6B:
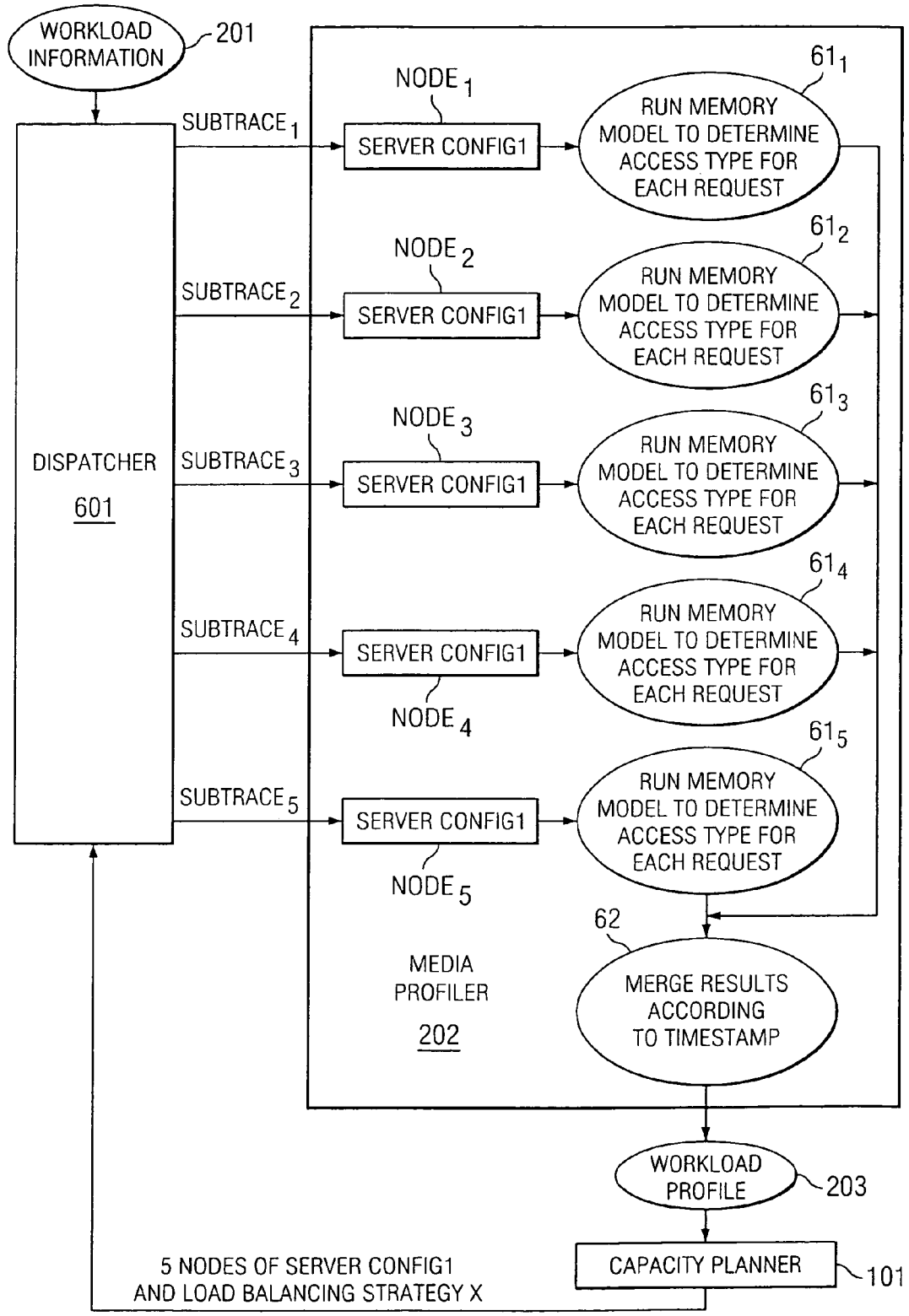
FIG. 6B shows an example of re-generating a workload profile for a cluster of servers of a particular configuration type in accordance with the example embodiment of FIG. 6A.

Turning to FIG. 6B, an example of re-generating workload profile 203 for a cluster of servers of a particular configuration type in accordance with one embodiment is shown. In this example, capacity planner 101 determines (e.g., from the service Demand computed for a single server of Server Config$_1$) that a cluster of 5 nodes of Server Config$_1$ are required for supporting the expected workload as desired (e.g., in compliance with Basic Capacity Parameters 104A and Performability Parameters 104B). Capacity planner 101 notifies dispatcher 601 of a cluster of 5 nodes of Server Config$_1$. In this example, capacity planner 101 also notifies dispatcher 601 of a load balancing strategy "X" that is to be used by the cluster. In this example, this load balancing strategy is assumed to be a round-robin strategy. of course, while this example is described as using a round-robin strategy, this embodiment may be readily adapted to be used for various other load balancing strategies.

While capacity planner 101 notifies dispatcher 601 of the load balancing strategy used in this example, such load balancing strategy may be provided to dispatcher 601 in some other way in alternative embodiments, such as through user input, dispatcher 601 reading the desired load balancing strategy to be used from a data storage device, etc. In this example, dispatcher 601 uses a round-robin load balancing strategy; and capacity planner 101 computes the service Demand for this workload profile 203.

Dispatcher 601 uses the round-robin load balancing strategy (e.g., strategy X in the example of FIG. 6B) to generate subtraces (which may be referred to herein as "sub-workloads") for workload 201. That is, dispatcher 601 divides workload 201 into 5 subtraces, Subtrace$_1$, Subtrace$_2$, . . . , Subtrace$_5$, wherein each subtrace identifies the portion of workload 201 (i.e., the corresponding requests) that is to be serviced by a corresponding one of the 5 nodes of Server Config$_1$ according to the round-robin load balancing strategy employed by the cluster under consideration. For instance, in the example of FIG. 6B, Subtrace$_1$ is generated for Node$_1$ of Server Config$_1$, Subtrace$_2$ is generated for Node$_2$ of Server Config$_1$, Subtrace$_3$ is generated for Node$_3$ of Server Config$_1$, Subtrace$_4$ is generated for Node$_4$ of Server Config$_1$, and Subtrace$_5$ is generated for Node$_5$ of Server Config$_1$. Each of the resulting subtraces are input to MediaProf 202, which processes each subtrace for its corresponding node of Server Config$_1$ to determine the access types of each request (memory versus disk). For instance, in the example embodiment of FIG. 6B, in operational block 61$_1$ MediaProf 202 runs the memory model (for Server Config$_1$) to determine the access type for each request in Subtrace$_1$ being serviced by Node$_1$. Similarly, in operational block 61$_2$ MediaProf 202 runs the memory model (for Server Config$_1$) to determine the access type for each request in Subtrace$_2$ being serviced by Node$_2$. Likewise, in each of operational blocks 61$_{3-5}$ MediaProf 202 runs the memory model (for Server Config$_1$) to determine the access type for each request in the respective Subtraces$_{3-5}$ being serviced by their corresponding Nodes$_{3-5}$. Then, in operational block 62, MediaProf 202 merges the results determined in operations 61$_{1-5}$ according to timestamp to generate a workload profile 203 for the cluster.

Accordingly, the newly generated workload profile 203 for the cluster under consideration identifies the number of concurrent requests serviced by the cluster at any given time, as well as an indication of the respective type of access for each request (memory versus disk). Therefore, the benchmarks and cost function for Server Config$_1$ can be used by capacity planner 101 to re-compute the service Demand for this cluster.

For instance, as shown in FIG. 6A, capacity planner 101 then uses the workload profile 203 generated for the cluster under consideration to compute, in block 602, a service Demand for such cluster. This is used to verify that the initially determined number of nodes in the cluster is accurate. For instance, continuing with the above example, capacity planner 101 verifies that the service Demand computed for the cluster indicates that 5 nodes of the first server configuration (Server Config$_1$) under consideration are needed in the cluster for supporting the workload in the desired manner. If the service Demand computed for the cluster indicates that 5 nodes are needed, capacity planner 101 outputs such a 5-node cluster as one possible solution. On the other hand, if the service Demand computed for the cluster indicates a different number of nodes, such as 4, then capacity planner 101 repeats the above process for a cluster of 4 nodes in order to verify the estimate of 4 nodes.

Figure 7:
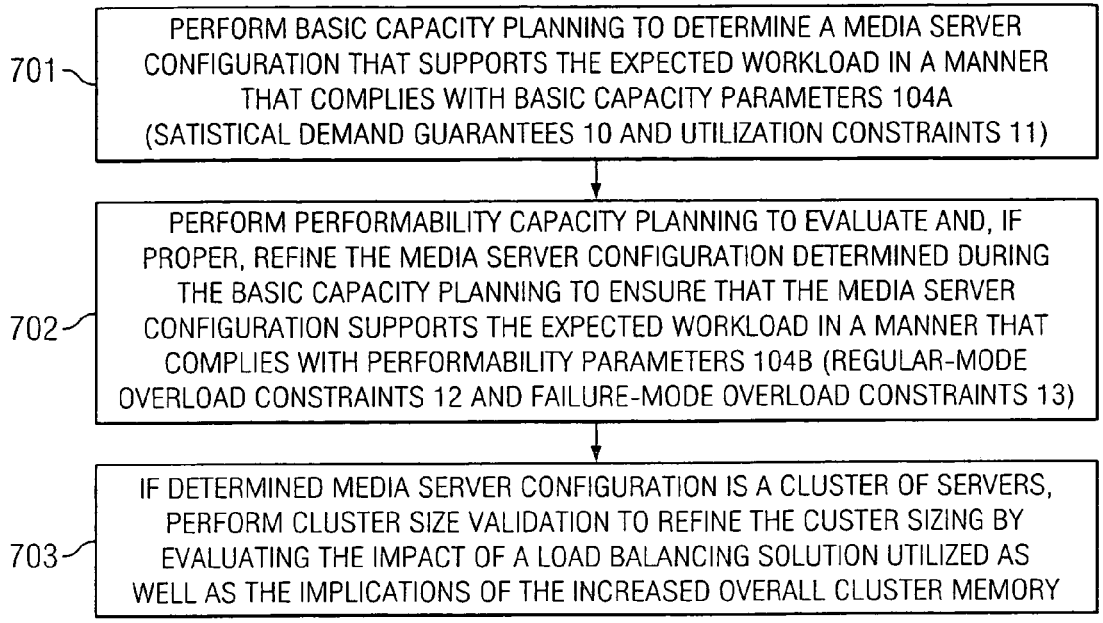
FIG. 7 shows an example operational flow diagram for the operation of one embodiment of a capacity planner.

Turning to FIG. 7, an example operational flow diagram for the operation of capacity planner 101 in accordance with one embodiment is shown. In operational block 701, capacity planner 101 performs Basic Capacity Planning to determine a media server configuration that supports the expected workload in a manner that complies with Basic Capacity Parameters 104A. That is, capacity planner 101 takes into account Statistical Demand Guarantees 10 and Utilization Constraints 11 in determining an initial media server configuration. In operational block 702, capacity planner 101 performs Performability Capacity Planning to evaluate and, if proper, refine the media server configuration determined during the Basic Capacity Planning process (of block 701) to ensure that the media server configuration supports the expected workload in a manner that complies with Performability Parameters 104B. That is, capacity planner 101 uses Regular-Mode Overload Constraints 12 and Failure-Mode Overload Constraints 13 to further evaluate the media server configuration determined during the Basic Capacity Planning process and thus determine whether to refine/modify such media server configuration in order to comply with these Performability Parameters 104B.

In certain embodiments, if the determined media server configuration that results from operations 701-702 is a cluster of servers, capacity planner 101 performs cluster size validation in operational block 703. That is, as discussed above with FIGS. 6A-6B, if a cluster solution is determined (in block 604), capacity planner 101 may evaluate the impact of a load balancing solution to be utilized by such cluster solution (e.g., which may be assumed in certain implementations to be a round-robin strategy), as well as the implications of the increased overall cluster memory, to verify that the number of servers to be included in the cluster is accurate, and refine the number of servers included such cluster solution if the number is inaccurate.

Considering further the Basic Capacity Planning performed in block 701, suppose the service provider would like to determine the number of servers (nodes) for its expected workload 201 for a given server S that has a memory size $M_S$. In accordance with one embodiment, there are several logical operations performed in this Basic Capacity Planning procedure. First, the media site workload profile 203 is computed. That is, using the media site access logs 201, MediaProf 202 computes a site workload profile 203 for a given memory size $M_S$ of interest (such as the example workload profiles described above in connection with FIGS. 3 and 4). During this initial analysis, the Dispatcher 601 that imitates the load balancing strategy for a cluster of N nodes, assumes N=1 (i.e., the workload is serviced by a single server S).

Capacity planner 101 then uses this workload profile 203 for computing a corresponding service demand profile for server S. As described above, capacity planner 101 has a collection of benchmarked configurations. Capacity planner 101 takes the media site workload profile 203 and computes the corresponding service demands according to capacity equation (1), discussed above, with the cost functions corresponding to the media server S. Thus, the resulting (intermediate) profile is a list of pairs $(t_i, d_i)$ reflecting that in time $t_i$ the service demand is $d_i$. Then, capacity planner 101 computes a cumulative density function (CDF) of aggregate service demand that is normalized over time. We assume in this example that media files are encoded at a constant bit rate (CBR), and it is therefore a straightforward task to compute the CDF of network bandwidth requirements and incorporate them in the capacity planning process.

The Basic Capacity Parameters 104A are then considered. Since workload measurements of existing media services indicate that client demands are highly variable (the "peak-to-mean" ratio may be an order of magnitude), it may not be cost-effective to overprovision the system for the peak load demand. In this case, the service provider may specify Statistical Demand Guarantees 10, which may specify, for example, that a desired media server configuration is one that provides a performance solution that 95% of the time is capable of processing the expected workload 201. Using the CDF of computed service demand profile, the capacity planner 101 is capable of determining the 95-th percentile of the site's service demands over time. Let us denote this demand as $D_{stat\_Demand\_Guarantee}$ (which in this example is denoted $D_{95\%}$).

The service provider may further specify Utilization Constraints 11, which may specify, for example, that a desired media server configuration is one that 90% of the time is utilized under 70% of its capacity under the expected workload 201. In this way a service provider may specify a configuration with some reasonable "spare" capacity for future growth and changing access patterns. Capacity planner 101 is operable to determine the 90-th percentile of the site's service demands, i.e., $D_{90\%}$. Then, the requirement for a configuration that is utilized under 70% of its capacity is ($D_{90\%}/0.7$). Let us denote this demand as $D_{Util}$.

Thus, the basic capacity planning in the above example determines the basic service demand as: $D_{basic}=\max(D_{95\%}, D_{util})$ rounded up to the closest integer. Thus, for example, if Dbasic is determined to be 4.5, an initial determination is made in the basic capacity planning process that a 5-node cluster of server S is a proper "basic" media server solution.

This basic capacity planning process of operational block 701 determines a suitable media server configuration by sizing the system according to the main performance requirements for the compliant time, e.g., identifies the system that is capable of processing the applied load with no performance degradation for 95%. However, it does not provide any guarantees or limits on how "bad" the system performance could be in the remaining 5% of non-compliant time. The Performability Capacity Planning of block 702 evaluates the workload performance on the media server configuration recommended by the Basic Capacity Planning process of block 701 (and, possibly, refine the configuration) in order to limit the amount of possible overload per node during the regular processing time and/or to avoid the excessive performance degradation during node failure periods.

Figure 8A:
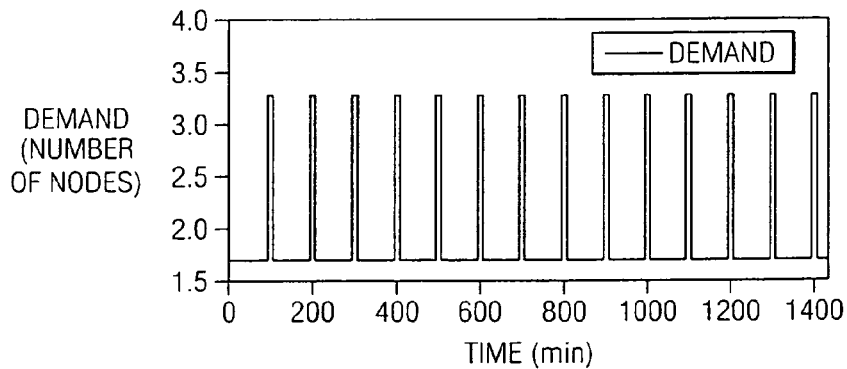
FIG. 8A shows a graph illustrating service demands for a first example workload, referred to as a "Thin Spikes" workload.
Figure 8B:
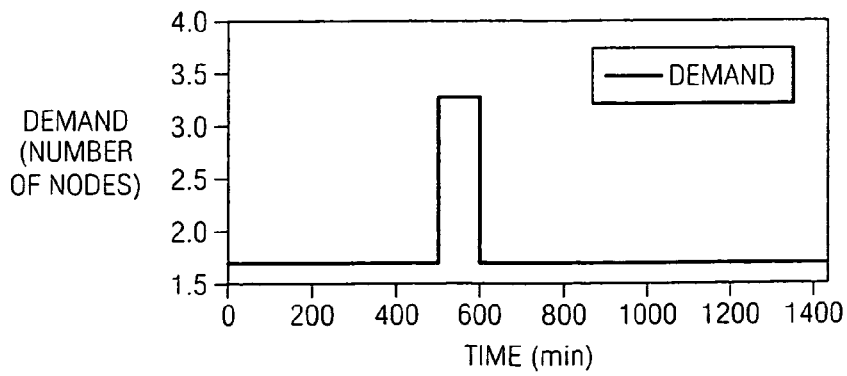
FIG. 8B shows a graph illustrating service demands for a second example workload, referred to as a "Fat Spikes" workload.

Let us first consider a simple example. FIGS. 8A-8B show the service demands of two example workloads over time (more exactly, a day-long sample of the workloads). That is, FIG. 8A shows service demands for a first example workload, and FIG. 8B shows service demands for a second example workload. Most of the time, the service demand of both workloads corresponds to 1.7 nodes. The peak load demand reaches 3.3 nodes for both workloads.

However, the access patterns of these two workloads are very different. The example workload shown in FIG. 8A has a number of peak-load spikes each lasting for 10 minutes (min) with more than 1-hour time gaps between each spike. Due to its nature, this first example workload is referred to herein as a "Thin Spikes" workload. The example workload shown in FIG. 8B has a different access pattern: there is a single peak-load spike lasting for a duration of 100 min. This second example workload is referred to herein as a "Fat Spikes" workload.

Figure 9A:
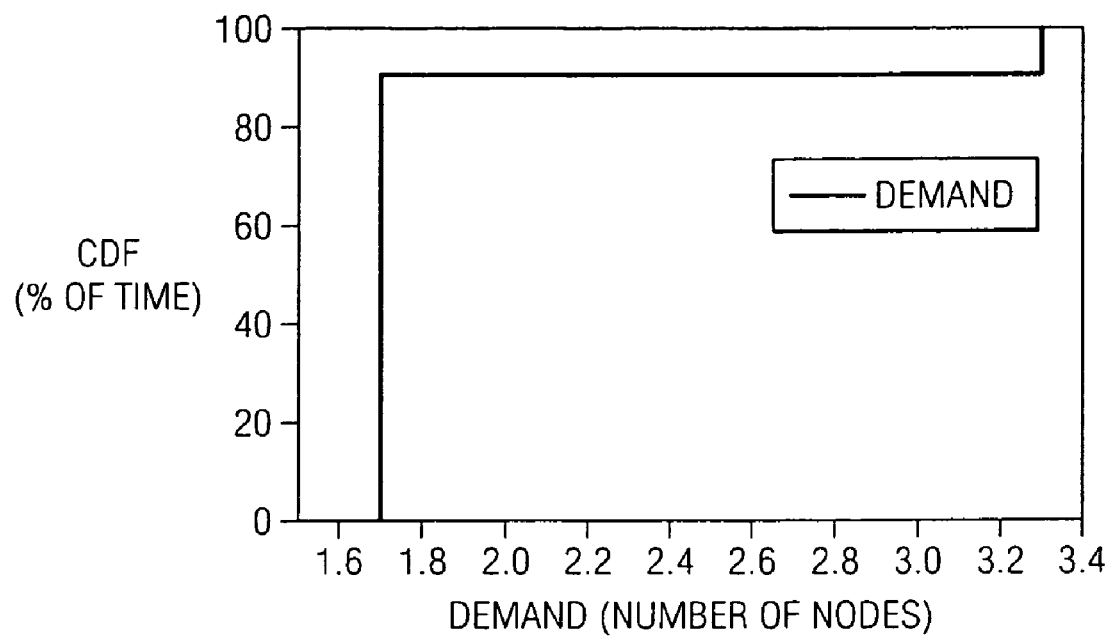
FIG. 9A shows a graph illustrating CDF service demand for each of the example workloads of FIGS. 8A and 8B.

As shown in the graph of FIG. 9A, these two workloads have the same CDF of service demand: 90% of the time, the service demand is 1.7 nodes, while for 10% of the time it reaches a peak load demand of 3.3 nodes.

In continuing with this example, suppose that a service provider specifies the desirable media server configuration as one that: a) 90% of the time satisfies the workload demand; and b) 90% of the time is utilized under 70%. Accordingly, in this example, the Basic Capacity Planning (of operational block 701) will recommend a 3-node cluster as an appropriate solution:

$$D_{basic}=\max(D_{90\%}, D_{Util})=\max(1.7, 2.4)=2.4$$

Figure 9B:
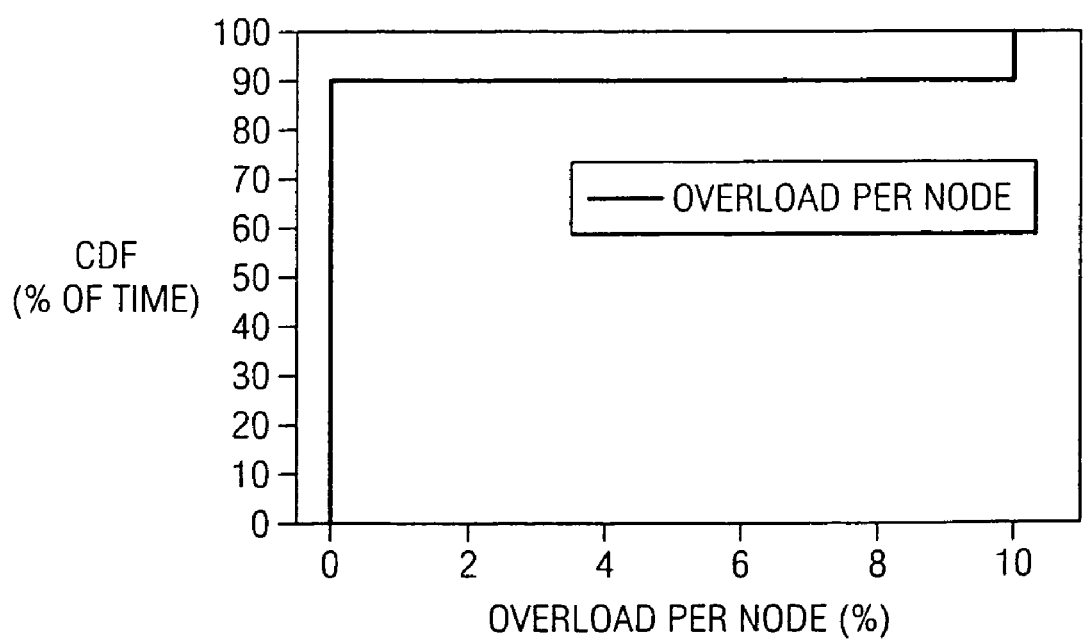
FIG. 9B shows a graph illustrating an amount of overload per node in an example 3-node media cluster for each of the example workloads of FIGS. 8A and 8B.

Since the peak service demand is 3.3 nodes, in the 3-node cluster, the applied load reaches 110% per node, i.e. the maximum overload per node reaches 10%, and it is observed for 10% of the time for both workloads, as shown in the graph of FIG. 9B.

While the "aggregate" amount of overload per node is the same for both workloads, there is a significant qualitative difference in the amount of "continuous" overload exhibited in the two example workloads considered above. Intuitively, while the "Thin Spikes" workload of FIG. 8A looks more bursty, the amount of overload per any continuous hour is limited: no more than 10 min of 10% overload. For the "Fat Spikes" workload of FIG. 8B, any 1-hour interval between the time stamps 500 and 600 experiences a continuous 10% overload.

From a quality of service (QoS) point of view, short spikes of performance degradations are less devastating than longer periods of degraded performance. As described further herein, certain embodiments provide a capacity planning tool that analyzes a given workload for the amount of continuous overload and is capable of taking this information into account during the capacity planning process. More specifically, certain embodiments enable a service provider to set limits (via the Performability Parameters 104B) on the amount of continuous overload that is encountered by a desired media server configuration under an expected workload, as described further below. Accordingly, Performability Capacity Planning of block 702, in accordance with certain embodiments, analyzes the performance of a given workload on the media server configuration recommended by the Basic Capacity Planning process (of block 701) for the amount of possible overload in any continuous time period of duration I during the regular processing time and during node failure periods.

More specifically, in accordance with certain embodiments capacity planner 101 builds an interval overload profile in the manner described hereafter. Let the N-node cluster be a media server configuration recommended by the Basic Capacity Planning process for a given workload 201, and let I be a duration of time interval of interest (in min). For computing the I-interval overload profile, service demand profile computed during the Basic Capacity Planning process (described above) is utilized. In accordance with one embodiment, a "moving window" technique is used. That is, a window is set to be 1 min duration, and the window is advanced by some step, "Step," e.g., advanced by a 1 min step. In certain embodiments, a service provider may specify (e.g., as part of Performability Parameters 104B) the interval value I and/or the step value Step to be used by the capacity planner in its evaluation. For each such I-interval, any service demand above N nodes is aggregated, and the result is averaged over N×I. This way, the average overload per node can be evaluated in any I-interval over the entire workload duration. Thus, the resulting I-interval overload profile is a list of pairs ($t_i$, $d_i$) reflecting that in the I-interval starting in time $t_i$ the average overload is $d_i$. For Performability Capacity Planning analysis (block 702 of FIG. 7) according to one embodiment, capacity planner 101 computes a cumulative density function (CDF) of aggregate I-interval overload which is normalized over the number of intervals.

Tables 1 and 2 each provide examples of interval overload profiles that may be used by the capacity planner in accordance with at least one embodiment herein for performing interval analysis of media server configuration's capability for supporting a given workload. That is, an interval analysis of the amount of overload experienced by the media server configuration during each interval of a given workload may be used for evaluating the quality of service provided by such media server configuration under the given workload.

TABLE 1

First Example Interval Overload Profile

| Interval Starting Time | Average Overload for Interval I |
| --- | --- |
| $t_1$ | 5% |
| $t_2$ | 10% |

TABLE 1-continued

First Example Interval Overload Profile

| Interval Starting Time | Average Overload for Interval I |
|---|---|
| $t_3$ | 3% |
| . | . |
| . | . |
| . | . |
| $t_T$ | 7% |

Table 1 shows a first example interval overload profile. As mentioned above, the interval overload profile may include a list of pairs $(t_i, d_i)$ reflecting that in the I-interval starting in time $t_i$ the average overload is $d_i$. For instance, in Table 1, the I-interval starting at time $t_1$ of the given workload has an average overload of 5%, the I-interval starting at time $t_2$ of the given workload has an average overload of 10%, the I-interval starting at time $t_3$ of the given workload has an average overload of 3%, and the last I-interval starting at time $t_T$ of the given workload has an average overload of 7%. The amount of time between the interval starting times, such as the amount of time between starting times $t_1$ and $t_2$, is referred to as the Step. Thus, the I-interval provides a "window" of time that is stepped through the workload at a defined amount for the Step. For example, Table 1 may represent an interval overload profile for an interval of I=60 min with a Step=1 min. In this case, each of starting times $t_1, t_2, \ldots, t_T$ are separated by 1 min of time in the workload, and the corresponding overload percentages specify the average amount of overload for a 60 min window of time starting at the corresponding starting time. Thus, because the defined Step amount (1 min) is smaller than the defined interval I (60 min), in this example, the interval windows overlap each other.

TABLE 2

Second Example Interval Overload Profile

| Interval Starting Time | Average Overload for Interval A (10 min) | Average Overload for Interval B (30 min) | Average Overload for Interval C (60 min) |
|---|---|---|---|
| $t_1$ | 0% | 8% | 11% |
| $t_2$ | 33% | 15% | 13% |
| $t_3$ | 20% | 10% | 7% |
| . | . | . | . |
| . | . | . | . |
| . | . | . | . |

Table 2 shows a second example interval overload profile. In this example, the interval overload profile includes a list of starting times and corresponding average overloads for different intervals (10 min, 30 min, and 60 min). Thus, this provides a list of $(t_i, d_i^{I=10}, d_i^{I=30}, d_i^{I=60})$ reflecting that starting at time $t_i$ the average overload for interval I=10 min is $d_i^{I=10}$, the average overload for interval I=30 min is $d_i^{I=30}$, and the average overload for interval I=60 min is $d_i^{I=60}$. For instance, in Table 2, the 10 min interval starting at time $t_1$ of the given workload has an average overload of 0%, the 30 min interval starting at time $t_1$ of the given workload has an average overload of 8%, and the 60 min interval starting at time $t_1$ of the given workload has an average overload of 11%. It should be noted that Table 2 will have more entries for the I=10 min intervals than for the I=30 min and I=60 min intervals because there are more 10 min intervals available in the workload than there are 30 min and 60 min intervals. For instance, when the time, $t_i$, is reached in the workload such that no further 30 min time intervals are available (e.g., only 29 min of workload information remains starting at time $t_i$), further 10 min intervals may still be available starting at such time $t_i$. Similarly, Table 2 will have more entries for the I=30 min intervals than for the I=60 min intervals. As with Table 1, the amount of time between the interval starting times, such as the amount of time between starting times $t_1$ and $t_2$, is referred to as the Step and may be defined (e.g., by a service provider) to be, for example, 1 min.

Figure 10A:
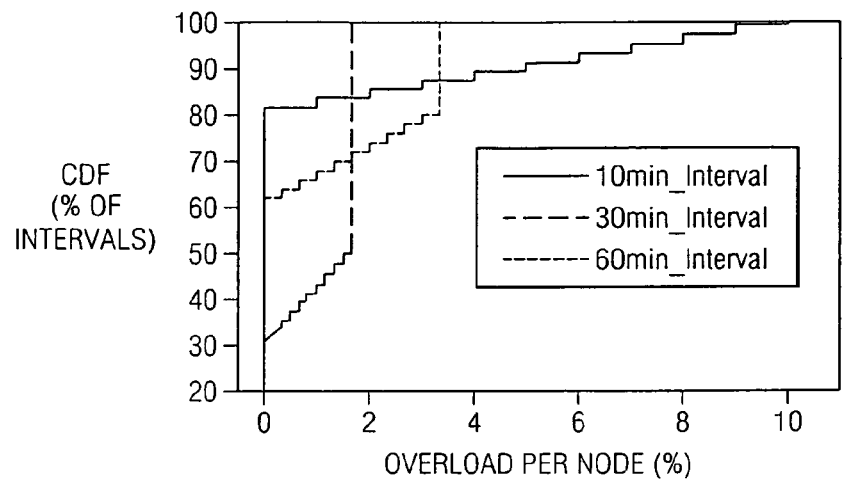
FIG. 10A shows a graph illustrating the CDF of I-interval overload for I=10 min, 30 min, and 60 min for the example Thin Spikes workload of FIG. 8A.
Figure 10B:
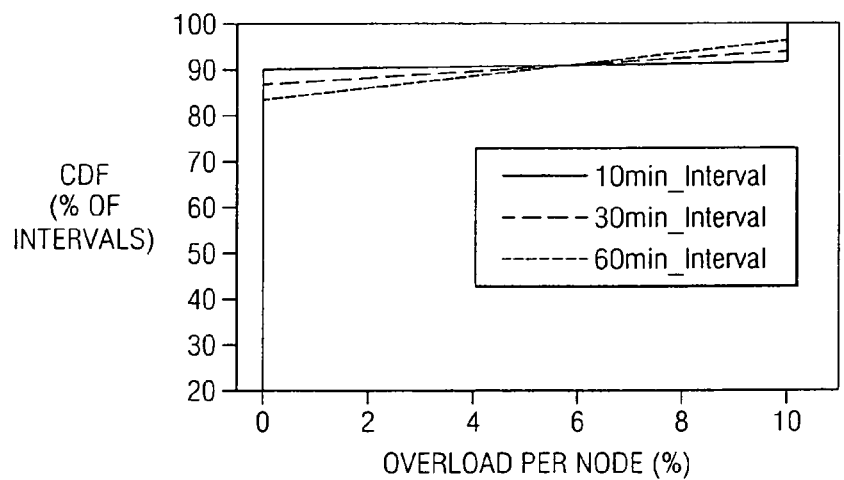
FIG. 10B shows a graph illustrating the CDF of I-interval overload for I=10 min, 30 min, and 60 min for the example Fat Spikes workload of FIG. 8B.

In particular, for the two example workloads considered above in FIGS. 8A ("Thin Spikes" workload) and 8B ("Fat Spikes" workload) and the 3-node cluster configuration determined in the example Basic Capacity Planning process described above, let us further consider the I-interval overload profiles for I=10 min, 30 min, and 60 min, as examples. FIG. 10A shows the CDF of I-interval overload for I=10 min, 30 min, and 60 min for the example Thin Spikes workload of FIG. 8A. FIG. 10B shows the CDF of I-interval overload for I=10 min, 30 min, and 60 min for the example Fat Spikes workload of FIG. 8B. For the "Thin Spikes" workload, the CDF of the three interval overload profiles are very different, as shown in the graph of FIG. 10A. For I of longer duration, the overall percentage of intervals with overload is higher than for I of shorter duration. However, the amount of average overload in longer intervals is correspondingly lower. It is consistent with the nature of access pattern in this example Thin Spikes workload: while the longer intervals more likely have the overloaded time periods within them, these overload periods are short, which leads to a lower average overload per interval. In contrast, for the "Fat Spikes" workload, the percentage of overloaded intervals and the amount of overload per interval are similar for all the three profiles, as shown in FIG. 10B, thus reflecting the longer periods of continuous overload in the given workload.

Suppose now that the service provider specifies in a performability parameter (as a Regular-Mode Overload Constraint 12) that a desirable media server solution is one in which the amount of average overload is limited by 2% in any 60 min interval under the expected workload 201. Let us consider and compose the CDF of 60 min-interval overload profiles for the example "Thin Spikes" workload (of FIG. 8A) and for the example "Fat Spikes" workload (of FIG. 8B). In the example "Thin Spikes" workload, only 30% of the 60 min-intervals do not have any overload, while in the "Fat Spikes" workload, the percentage of 60 min-intervals that do not have any overload reaches 84%. However, in the "Thin Spikes" workload, the average overload is limited by 2% in any 60 min-interval, while in the "Fat Spikes" workload, 10% of the 60 min-intervals have overload higher than 2%. Thus, for the "Thin Spikes" workload, the 3-node cluster solution for server S satisfies this performability parameter. For the "Fat Spikes" workload, the 3-node cluster solution does not satisfy the overload constraint defined in this performability parameter, and capacity planner 101 will thus consider and iteratively verify a 4-node solution. For the "FatSpikes" workload, the 4-node cluster is the minimal solution satisfying the given performability parameter in this example.

Let us denote the outcome of the performability capacity planning for acceptable overload during the Regular-Mode processing (i.e., with no failed nodes) as $D_{Overload}^{Reg}$.

In defining the performability parameters 104B, the service provider should choose the duration of interval, I, and degree of overload which reflects the service tolerance to overload (or QoS degradation of the service). Specifying a short overload interval (i.e., setting the tolerance to continuous overload being very low) might diminish the usefulness of interval overload analysis because the CDF of interval overload profile will closely represent the CDF "tail" of the original service demand, and it might result in the "overprovisioning" for rare and short demand spikes.

Additionally, the I-interval overload profile may provide a very useful insight into possible performance degradation in case of a node failure in the cluster. When a node failure happens in the N-node cluster, it can still provide the service with the remaining N−1 nodes, but possibly, at a price of degraded performance. As mentioned above, media traffic is often very bursty, and hence, it is likely that N−1 nodes are able to support the applied traffic during some time periods without performance degradation and be significantly overloaded during the other ones. Since a node failure lasts a continuous period of time, the I-interval overload analysis for the N−1 node cluster provides both quantitative and qualitative characterization of possible amount of overload and its nature in case of a node failure. Similar analysis can be performed for 2-node failures, etc. Thus, in certain embodiments, a service provider may specify, as a Node-Failure Mode Overload Constraint 13, an amount of overload permissible for any number of node failures (e.g., no more than X % overload for 1 node failure, no more than Y % overload for 2 node failures, etc.).

Figure 10C:
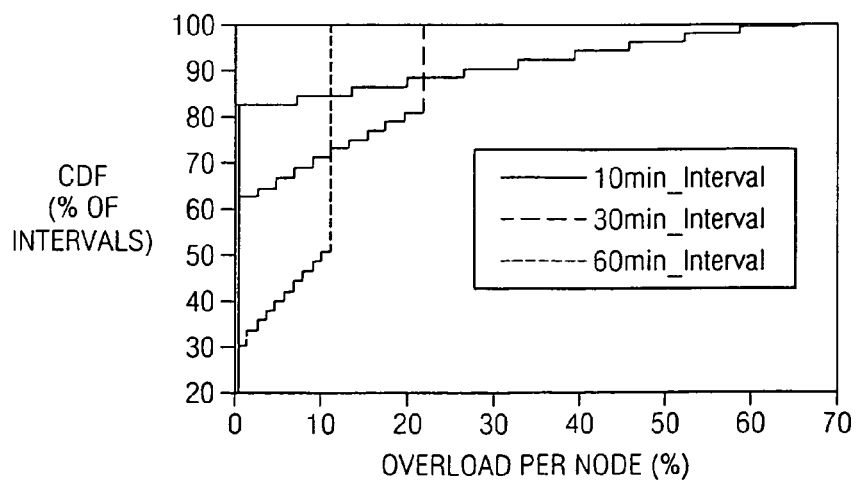
FIG. 10C shows a graph of the CDF of I-interval overload for I=10 min, 30 min, and 60 min in the case in which the example 3-node cluster (of FIG. 9B) has one failed node and the remaining 2-node cluster is processing the example "Thin Spikes" workload of FIG. 8A.

FIG. 10C shows a graph of the CDF of I-interval overload for I=10 min, 30 min, and 60 min in the case in which the 3-node cluster (determined in the above example) has one failed node and the remaining 2-node cluster is processing the example "Thin Spikes" workload of FIG. 8A. While there are 10 min intervals with high continuous overload reaching 65%, these intervals are very rare, and 80% of 10 min intervals do not have any overload.

Suppose now that the service provider specifies in a performability parameter (as a Node-Failure Mode Overload Constraint 13) that a desirable media server solution is one in which in the case of 1-node failure in the media cluster the amount of average overload per node in the remaining system is limited by 20% in any 60 min interval under the expected workload 201. To satisfy this performability parameter, capacity planner 101 will recommend a 3-node cluster solution for the example "Thin Spikes" workload and a 4-node cluster solution for the example "Fat Spikes" workload. Let us denote the outcome of the Performability Capacity Planning for acceptable overload during 1-node failures as $D_{Overload}^{N-1}$.

In accordance with at least one embodiment, the Performability analysis (of block 702 of FIG. 7) enables the service provider to evaluate the performance of a given workload on the configuration recommended by the Basic Capacity Planning process for the amount of possible overload in any continuous time period of duration I both during the Regular-Mode processing time (with no failed nodes in the media server cluster) and during the Node-Failure Mode periods (with one or more failed nodes in the media server cluster). The service provider can specify the appropriate parameters for the Performability Capacity Planning by defining: Regular-Mode Overload Constraints 12 and Node-Failure Mode Overload Constraints 13.

In the above example, the desirable media server configuration may be determined by capacity planner 101 as:

$$D_{overall} = \max(D_{basic}, D_{Overload}^{Reg}, D_{Overload}^{N-1})$$

rounded up to the closest integer.

Considering further the cluster size validation performed in operational block 703 of FIG. 7, in accordance with one embodiment, if the configuration recommended by the capacity planning process of operational blocks 701 and 702 is a single machine configuration (as in block 603 of FIG. 6A) then the capacity planning procedure is completed. Otherwise, capacity planner 101 performs an additional refinement of the cluster sizing by evaluating the impact of the load balancing solution as well as the implications of the increased overall cluster memory (such as described above with FIG. 6B). While in certain embodiments, such validation is performed after completion of both the Basic Capacity Planning and the Performability Capacity Planning processes (of blocks 701 and 702), in certain other embodiments such validation is performed after the Basic Capacity Planning process of operational block 701 if such Basic Capacity Planning process recommends a multi-node cluster solution instead of or in addition to such validation being performed after the Performability Capacity Planning process of operational block 702. For instance, such validation may first be performed to ensure that a proper number of clustered nodes is determined during the Basic Capacity Planning process to arrive at an initial media server configuration that is capable of supporting the expected workload in compliance with specified Basic Capacity Parameters 104A. Thereafter, such initial media server configuration determined during the Basic Capacity Planning process may be evaluated and, if appropriate, refined in operational block 702 to arrive at a solution that is capable of supporting the expected workload in compliance with specified Performability Parameters 104B. Of course, if the Performability Capacity Planning process of operational block 702 arrives at a multi-node cluster solution, the cluster number validation process may be performed to ensure that a proper number of clustered nodes is determined during the Performability Capacity Planning process.

A cluster of N nodes represents N times greater processing power, and at the same time, it has N times larger combined memory. Since the classification of client requests into memory/disk accesses during the first iteration of capacity planning process is done on a bases of a "single node" memory model, if the computed outcome is a multi-node solution, it is desirable to re-evaluate workload performance on the cluster of recommended size by taking into account the load-balancing solution and the impact of increased memory in a cluster (due to multiple nodes), as in the example validation process of FIG. 6B and operational block 703 of FIG. 7.

Figure 11:
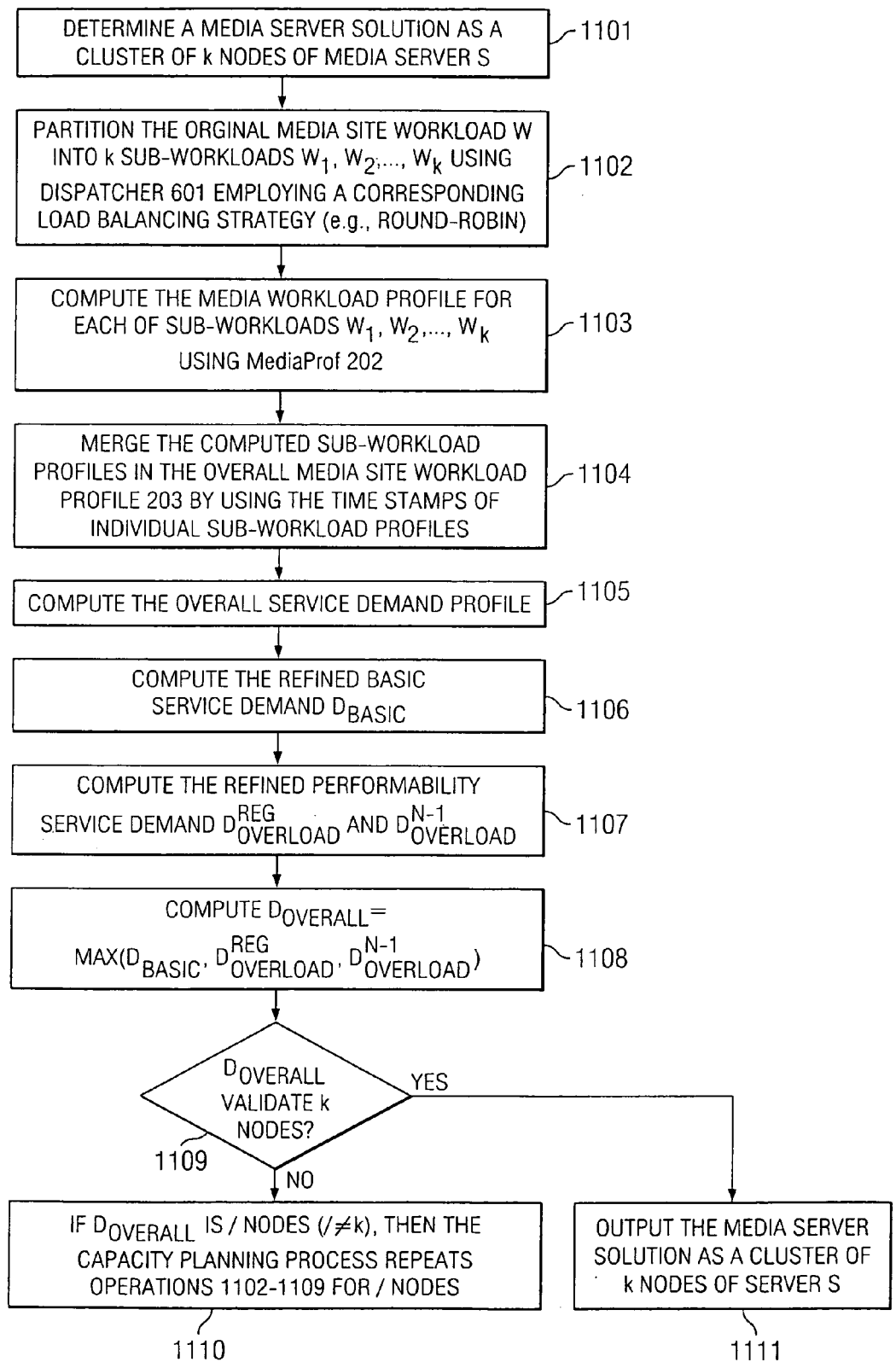
FIG. 11 shows an operational flow diagram for an example cluster size validation process in accordance with one embodiment.

FIG. 11 shows an operational flow diagram for an example of such a cluster size validation process in accordance with one embodiment. For this example, let the outcome of the first iteration of capacity planner 101 (e.g., a first iteration of performing both Basic Capacity Planning 702 and Performability Capacity Planning 703) for the expected media site workload be the capacity requirement of k nodes of the media server S (wherein k>1), in operational block 1101. In operational block 1102, dispatcher 601 employs a corresponding load balancing strategy (e.g., the Round-Robin strategy) to partition the expected media site workload W (labeled 201 in FIG. 6A) into k sub-workloads $W_1, W_2, \ldots, W_k$. In operational block 1103, MediaProf 202 computes the media workload profile for each of sub-workloads $W_1, W_2, \ldots, W_k$. In operational block 1104, MediaProf 202 merges the computed sub-workload profiles into an overall media site workload profile 203 (as in operational block 602 of FIG. 6B) by using the time stamps of individual sub-workload profiles.

In operational block 1105, capacity planner 101 uses the generated workload profile 203 to compute an overall service demand profile for the media solution of k clustered nodes of server S. In operational block 1106, capacity planner 101 performs Basic Capacity Planning (operation 701 of FIG. 7) to compute the refined basic service demand $D_{basic}$. In operational block 1107, capacity planner 101 performs Performability Capacity Planning (operation 702 of FIG. 7) to compute the refined performability service demand $$D_{Overload}^{Reg} \text{ and } D_{Overload}^{N-1}.$$

In operational block 1108, capacity planner 101 computes $$D_{Overall} = \max(D_{basic}, D_{Overload}^{Reg}, D_{Overload}^{N-1})$$

to determine the service demand for this k clustered nodes of server S supporting the expected workload in the desired manner. In operational block 1109, capacity planner 101 determines whether the computed $D_{overall}$, validates the k nodes (i.e., whether $D_{overall}$, rounded up to the nearest integer, equals k). If determined in block 1109 that the computed $D_{overall}$ validates the k nodes, then the cluster sizing is determined to be correct and the capacity planning process for the considered S server type is completed. Accordingly, in block 1111, the solution of k clustered nodes of server S is output as the proper media server configuration for the service provider). If, on the other hand, the computed $D_{overall}$ does not validate the k nodes but instead provides l nodes (l≠k) as the proper solution, then (as shown in block 1110) the capacity planning process (operational blocks 1102-1109) is repeated for the cluster configuration of l nodes.

FIG. 12 shows an operational flow diagram of one embodiment for using a capacity planning tool, such as the example capacity planning systems described above. As shown, operational block 1201 receives configuration information for at least one server into a capacity planning tool. As examples, capacity planner 101 may have such configuration information input by a user (e.g., a service provider), or capacity planner 101 may read such configuration information from a data storage device (e.g., RAM, hard disk, etc.) of the capacity planning system (e.g., the configuration information may be pre-stored to the capacity planning system). Operational block 1202 receives into the capacity planning tool workload information representing an expected workload of client accesses of streaming media files from a site. In operational block 1203, the capacity planning tool receives service parameters 104 that define desired service characteristics to be provided by the media server configuration under the expected workload. In accordance with various embodiments, such service parameters 104 may be input by a user (e.g., a service provider), or capacity planner 101 may read such service parameters 104 from a data storage device (e.g., RAM, hard disk, etc.) of the capacity planning system. For instance, the service parameters 104 may be pre-stored to the capacity planning system (e.g., stored as profile information for a given service provider that details the service characteristics, such as Basic Capacity Parameters and Performability Parameters, desired by the service provider). In operational block 1204, capacity planner 101 determines how many of the at least one server to be included at the site for supporting the expected workload in compliance with the specified service parameters 104, as desired by the service provider.

FIG. 13 shows, in greater detail, an operational flow diagram of an example implementation of an embodiment for determining one or more media server configurations having sufficient capacity for supporting an expected workload of a service provider in compliance with defined service parameters. In operational block 1301, access logs are collected for a service provider site over a period of time sufficient to represent the service provider's typical workload. In operational block 1302, the access logs are supplied to a media profiler 202, and the media profiler 202 processes the access logs to generate a workload profile 203 for at least one server configuration under consideration. In operational block 1303, the workload profile 203 generated by the workload profiler 202 is supplied to a capacity planner 101, and the capacity planner 101 is supplied desired service parameters 104 that define desired service characteristics to be provided by the solution media server configuration under the expected workload. The capacity planner 101 processes the workload profile 203 to determine at least one media server configuration formed using the at least one server configuration under consideration that has sufficient capacity for supporting the service provider site's workload in accordance with the service parameters 104. That is, capacity planner 101 determines one or more media server configuration(s) (e.g., single-machine and/or clustered implementations) that can be formed with the at least one server configuration under consideration and that are capable of supporting the service provider site's workload in accordance with the desired service parameters.

In performing operational block 1303, the capacity planner 101, in certain implementations, performs the operations 1303$_A$, 1303$_B$, 1303$_C$, 1303$_D$, and 1303$_E$ as shown in the example of FIG. 13. For instance, the capacity planner 101, in block 1303$_A$, uses benchmarks for the server configuration(s) under consideration to derive a cost function for such server configuration(s). In block 1303$_B$, the capacity planner uses the corresponding cost function for the server configuration(s) under consideration to determine a cost of resources consumed by the corresponding server configuration(s) in supporting the workload. In block 1303$_C$, the capacity planner 101 generates a service demand profile for the server configuration(s) under consideration. In block 1303$_D$, the capacity planner 101 determines from the corresponding service demand profile how many of a given server configuration are needed for supporting the service provider's workload in accordance with the service parameters 104, such as Basic Capacity Parameters 104A and Performability Parameters 104B. As described above, this initial computation of the service demand profile based on the resources of a single machine of a given server configuration provides an indication of whether a single machine or a cluster of such server configurations is needed to support the expected workload for the service provider's site in compliance with the defined service parameters. If more than one of a given server configuration is determined to be needed (i.e., a cluster configuration is determined to be needed), the capacity planner 101 verifies, in block 1303$_E$, the number of nodes to be included in a clustered configuration, taking into account at least one load balancing strategy to be used by such clustered configuration. For instance, as described above in connection with FIGS. 6B and 7, an iterative process may be used wherein the media profile and service demand profile are re-computed for a cluster of the number of nodes as initially determined by the capacity planner 101 to verify that the estimated number of nodes holds true when the actual resources of such a cluster are used in the evaluation process.

In block 1304, the capacity planner may, in some instances, compare the resulting media server configuration solutions determined to be capable of supporting the service provider's workload in compliance with the Basic Capacity Parameters 104A and Performability Parameters 104B to determine an optimal one of those media server configuration solutions to be implemented at the service provider's site (e.g., based on relative price, overall capacity/performance, etc.).

When implemented via computer-executable instructions, various elements of embodiments described herein for evaluating server configuration(s)' capacity for supporting an expected workload are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

FIG. 14 illustrates an example computer system 1400 adapted according to an embodiment for evaluating server configuration(s') capacity for supporting an expected workload in compliance with defined service parameters. That is, computer system 1400 comprises an example system on which embodiments described herein may be implemented. Central processing unit (CPU) 1401 is coupled to system bus 1402. CPU 1401 may be any general purpose CPU. The above-described embodiments of a capacity planning system are not restricted by the architecture of CPU 1401 as long as CPU 1401 supports the inventive operations as described herein. CPU 1401 may execute the various logical instructions according to embodiments described herein. For example, CPU 1401 may execute machine-level instructions according to the exemplary operational flows described above in conjunction with FIGS. 6A-6B, 7, 11, 12, and 13.

Computer system 1400 also preferably includes random access memory (RAM) 1403, which may be SRAM, DRAM, SDRAM, or the like. Computer system 1400 preferably includes read-only memory (ROM) 1404 which may be PROM, EPROM, EEPROM, or the like. RAM 1403 and ROM 1404 hold user and system data and programs, as is well known in the art.

Computer system 1400 also preferably includes input/output (I/O) adapter 1405, communications adapter 1411, user interface adapter 1408, and display adapter 1409. I/O adapter 1405, user interface adapter 1408, and/or communications adapter 1411 may, in certain embodiments, enable a user to interact with computer system 1400 in order to input information thereto.

I/O adapter 1405 preferably connects storage device(s) 1406, such as one or more of hard drive, compact disc (CD) drive, floppy disk drive, tape drive, etc. to computer system 1400. The storage devices may be utilized when RAM 1403 is insufficient for the memory requirements associated with storing data for application programs. RAM 1403, ROM 1404, and/or storage devices 1406 may be used for storing computer-executable code for evaluating the capacity of a server configuration in accordance with the embodiments described above. Communications adapter 1411 is preferably adapted to couple computer system 1400 to network 1412.

User interface adapter 1408 couples user input devices, such as keyboard 1413, pointing device 1407, and microphone 1414 and/or output devices, such as speaker(s) 1415 to computer system 1400. Display adapter 1409 is driven by CPU 1401 to control the display on display device 1410.

It shall be appreciated that the embodiments of a capacity planning system described herein are not limited to the architecture of system 1400. For example, any suitable processor-based device may be utilized, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structure capable of executing logical operations according to the embodiments described above.

What is claimed is:

1. A method comprising:
   receiving, into a capacity planning system, workload information representing an expected workload of client accesses of streaming media files from a site;
   receiving, into said capacity planning system, at least one service parameter that defines a desired service characteristic to be provided by a media server configuration under the expected workload and defines a desired service characteristic to be provided by a media server configuration during periods of degraded service under the expected workload; and
   determining, by said capacity planning system, for at least one server configuration, how many servers of said at least one server configuration to be included at said site for supporting the expected workload in compliance with said at least one service parameter, wherein said at least one service parameter specifies a limit on the amount of degradation of service encountered during said periods of degraded service.

2. A method comprising:
   receiving, into a capacity planning tool, workload information representing an expected workload of client accesses of streaming media files over a period of time T;
   said capacity planning tool determining, for at least one media server configuration under evaluation, an amount of overload encountered by said at least one media server configuration during each of a plurality of time intervals of said expected workload; and
   said capacity planning tool receiving at least one performability parameter that defines a desired limit on the amount of continuous overload encountered by a media server configuration under the expected workload.

3. The method of claim 2 where each of said plurality of time intervals have a size I where I<T.

4. The method of claim 2 wherein beginning points of each of said plurality of time intervals are separated by a Step amount.

5. The method of claim 4 wherein said Step<I.

6. The method of claim 4 wherein each of said intervals has a duration of 1 hour and said Step is 1 minute.

7. The method of claim 2 wherein said capacity planning tool evaluates said amount of overload encountered by said at least one media server configuration during each of said plurality of time intervals to determine whether said at least one media server configuration satisfies said at least one performability parameter.

8. The method of claim 2 wherein said at least one performability parameter comprises at least one selected from the group consisting of:
   a regular-mode overload constraint that specifies a desired limit on the amount of degradation in service that is encountered during periods of performance degradation under regular system operation of a media server configuration, and
   a node-failure-mode overload constraint that specifies a desired limit on the amount of degradation in service that is encountered during periods in which one or more nodes of a clustered media server configuration have failed.

9. A method comprising:
   receiving, into a capacity planning tool, workload information identifying an expected workload of client accesses of streaming media files from a server over a period of time T;
   determining, by said capacity planning tool, an interval overload profile for a media server configuration under evaluation, wherein said interval overload profile specifies an amount of overload of said media server configuration for each of a plurality of time intervals of duration I of said expected workload, where I<T; and
   said capacity planning tool determining based at least in part on the interval overload profile whether said media server configuration under evaluation supports the expected workload in compliance with defined service parameters that define service characteristics desired by a service provider, wherein said defined service parameters include at least one performability parameter that defines a desired limit on the amount of continuous overload encountered by a media server configuration under the expected workload.

10. The method of claim 9 wherein beginning points of each of said plurality of time intervals are separated by a Step amount.

11. The method of claim 10 wherein said Step<I.

12. The method of claim 9 wherein said capacity planning tool evaluates said interval overload profile for said media server configuration under evaluation to determine whether said media server configuration under evaluation satisfies said at least one performability parameter.

13. The method of claim 9 wherein said at least one performability parameter comprises at least one selected from the group consisting of:
   a regular-mode overload constraint that specifies a desired limit on the amount of degradation in service that is encountered during periods of performance degradation under regular system operation of a media server configuration, and
   a node-failure-mode overload constraint that specifies a desired limit on the amount of degradation in service that is encountered during periods in which one or more nodes of a clustered media server configuration have failed.

14. A system comprising:
   means for receiving workload information representing an expected workload of client accesses of streaming media files from a site over a period of time T;
   means for determining, for at least one media server configuration under evaluation, an amount of overload encountered by said at least one media server configuration during servicing each of a plurality of time intervals of said expected workload; and
   a means for receiving at least one performability parameter that defines a desired limit on the amount of continuous overload encountered by at least one media server configuration.

15. The system of claim 14 further comprising:
   means for receiving information specifying duration of each of said time intervals.

16. The system of claim 14 where each of said plurality of time intervals have a duration I where I<T.

17. The system of claim 14 wherein beginning points of each of said plurality of time intervals are separated by a Step amount.

18. The system of claim 17 wherein said Step is smaller in duration than a duration I of each of said intervals.

19. The system of claim 14 further comprising:
   means for evaluating the determined amount of overload encountered by said at least one media server configuration under evaluation for each of said plurality of time intervals to determine whether said at least one media server configuration under evaluation satisfies said at least one performability parameter.

20. The system of claim 14 wherein said at least one performability parameter comprises at least one selected from the group consisting of:
   a regular-mode overload constraint that specifies a desired limit on the amount of degradation in service that is encountered during periods of performance degradation under regular system operation of said at least one media server configuration under evaluation, and
   a node-failure-mode overload constraint that specifies a desired limit on the amount of degradation in service that is encountered during periods in which one or more nodes of a clustered media server configuration under evaluation have failed.

21. A system comprising:
   a media profiler operable to receive workload information for a service provider's site and generate a workload profile for a server configuration under consideration for supporting the service provider's site; and
   a capacity planner operable to receive the generated workload profile for the server configuration under consideration and determine how many servers of said server configuration are needed to provide a media server solution having sufficient capacity for supporting the site's workload in compliance with defined performability parameters that specify a desired limit on degradation of quality of service provided by said media server solution during periods of degraded service.

22. The system of claim 21 wherein said periods of degraded service is comprise periods in which said media server configuration is unable to serve at least one stream so as to avoid interruptions in the presentation of such stream.

23. The system of claim 21 wherein said defined performability parameters comprise at least one selected from the group consisting of:
   a regular-mode overload constraint that specifies a desired limit on the amount of degradation in service that is encountered during periods of degraded service under regular system operation of said media server solution, and
   a node-failure-mode overload constraint that specifies a desired limit on the amount of degradation in service that is encountered during periods in which one or more nodes of a clustered media server solution have failed.

* * * * *

UNITED STATES PATENT AND TRADEMARK OFFICE
CERTIFICATE OF CORRECTION

PATENT NO.        : 8,060,599 B2
APPLICATION NO.   : 10/801793
DATED             : November 15, 2011
INVENTOR(S)       : Ludmila Cherkasova et al.

It is certified that error appears in the above-identified patent and that said Letters Patent is hereby corrected as shown below:

In column 36, line 43, in Claim 22, after "service" delete "is".

Signed and Sealed this
Twentieth Day of November, 2012

David J. Kappos
*Director of the United States Patent and Trademark Office*